(12) United States Patent
Deck et al.

(10) Patent No.: US 10,591,284 B2
(45) Date of Patent: Mar. 17, 2020

(54) METROLOGY OF MULTI-LAYER STACKS

(71) Applicant: Zygo Corporation, Middlefield, CT (US)

(72) Inventors: Leslie L. Deck, Middletown, CT (US); Peter J. de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 16/286,833

(22) Filed: Feb. 27, 2019

(65) Prior Publication Data
US 2019/0265023 A1   Aug. 29, 2019

Related U.S. Application Data

(60) Provisional application No. 62/636,419, filed on Feb. 28, 2018.

(51) Int. Cl.
| | | |
|---|---|---|
| *G01B 9/02* | (2006.01) | |
| *G01B 11/24* | (2006.01) | |
| *G01B 11/06* | (2006.01) | |
| *G01B 11/02* | (2006.01) | |

(52) U.S. Cl.
CPC ........ *G01B 11/2441* (2013.01); *G01B 9/0201* (2013.01); *G01B 9/02004* (2013.01); *G01B 9/02028* (2013.01); *G01B 9/02057* (2013.01); *G01B 9/02072* (2013.04);
(Continued)

(58) Field of Classification Search
CPC . G01B 11/06; G01B 11/0675; G01B 11/2441; G01B 9/02083; G01B 9/02084; G01B 9/0209
See application file for complete search history.

(56) References Cited

U.S. PATENT DOCUMENTS

| | | |
|---|---|---|
| 5,398,113 A | 3/1995 | de Groot |
| 5,953,124 A | 9/1999 | Deck |
| 6,882,432 B2 | 4/2005 | Deck |
| | (Continued) | |

FOREIGN PATENT DOCUMENTS

WO   WO 2005/117534   12/2005

OTHER PUBLICATIONS de Groot, et al., "Three-dimensional imaging by Sub-Nyquist sampling of white-light interferograms", *Opt. Lett.*, vol. 18, No. 17, pp. 1462-1464 (Sep. 1, 1993).
(Continued)

*Primary Examiner* — Jonathan M Hansen
(74) *Attorney, Agent, or Firm* — Fish & Richardson P.C.

(57) ABSTRACT

Techniques for removing interferometry signal phase variations caused by distortion and other effects in a multi-layer stack include: providing an electronic processor sample interferometry data acquired for the stack using a low coherence imaging interferometry system; transforming, by the electronic processor, the sample interferometry data to a frequency domain; identifying a non-linear phase variation from the sample interferometry data in the frequency domain, in which the non-linear phase variation is a result of dispersion introduced into a measurement beam by the test sample; and removing the non-linear phase variation from the sample interferometry data thereby producing compensated interferometry data.

40 Claims, 14 Drawing Sheets

(52) U.S. Cl.
CPC ........ *G01B 9/02084* (2013.01); *G01B 11/026* (2013.01); *G01B 11/06* (2013.01)

(56) References Cited

U.S. PATENT DOCUMENTS

| | | |
|---|---|---|
| 7,522,288 B2 | 4/2009 | de Groot |
| 8,045,175 B2 | 10/2011 | de Groot et al. |
| 9,377,292 B2 | 6/2016 | de Groot |
| 2002/0109851 A1 | 8/2002 | Deck |
| 2006/0262321 A1 | 11/2006 | de Groot |
| 2006/0285120 A1 | 12/2006 | Aiyer |
| 2009/0182528 A1 | 7/2009 | de Groot et al. |
| 2012/0044501 A1* | 2/2012 | Oikaze ............... G01B 11/0625 356/503 |
| 2012/0218560 A1* | 8/2012 | Joo ................... G01B 11/0675 356/503 |

OTHER PUBLICATIONS

Deck, et al., "High-speed non-contact profiler based on scanning white light interferometry", *Applied Optics*, vol. 33, No. 31, pp. 7334-7338 (Nov. 1, 1994).

The International Search Report and Written Opinion of the International Searching Authority for International Application No. PCT/US2019/019827 dated Jun. 12, 2019.

\* cited by examiner

METROLOGY OF MULTI-LAYER STACKS

CROSS REFERENCE TO RELATED APPLICATION

This application claims priority to U.S. Provisional Patent Application No. 62/636,419, filed on Feb. 28, 2018, pursuant to 35 USC § 119. The entire content of this provisional application is herein incorporated by reference in its entirety

TECHNICAL FIELD

The present disclosure relates to metrology of multi-layer stacks.

BACKGROUND

Physical devices for facilitating wearable virtual and/or augmented reality (VR/AR) typically employ stacks containing multiple parallel plates. The parallel plates within the stack may have features and coatings applied to their surfaces to act as waveguides such that, when the device is placed in front of a user's eye, light information from the device periphery is carried and redirected to the eye to produce data or image overlays without blocking normal vision. In some cases, the stacks employ many plates arranged in parallel where each plate guides a different color of light (e.g., red, green and blue). To maintain high quality images, it can be important to achieve good parallelism between plates, to ensure certain surfaces have a desired flatness, and to maintain specific separation distances between the plates during manufacturing, among other factors. The measurement of such parameters can be difficult, however, due to the influence of undesired light reflected from surfaces or features within the stack.

SUMMARY

The present disclosure relates to metrology of multi-layer stacks.

In general, in some aspects, the subject matter of this disclosure may be embodied in methods that include: providing to an electronic processor sample interferometry data acquired for a test sample using a low coherence imaging interferometry system, in which the test sample includes multiple layers arranged in a stack; transforming, by the electronic processor, the sample interferometry data to a frequency domain; identifying a non-linear phase variation from the sample interferometry data in the frequency domain, in which the non-linear phase variation is a result of dispersion introduced into a measurement beam by the test sample; and removing the identified non-linear phase variation from the sample interferometry data in the frequency domain thereby producing compensated interferometry data.

Implementations of the methods can include one or more of the following features and/or features of other aspects. For example, in some implementations, the methods include: directing the measurement beam along a measurement beam path so as to be incident on the test sample; directing a reference beam along a reference beam path so as to contact a reference surface, in which the measurement beam and the reference beam are derived from light emitted by a common source, the light including multiple wavelengths, in which the test sample is at least partially transparent to the plurality of wavelengths; combining the reference beam and the measurement beam to form an output beam after the reference beam and the measurement beam contact the reference surface and the test sample, respectively; directing the output beam to a detector array including multiple detector elements; and recording, from the detector array, multiple interference signals, each interference signal of the multiple interference signals corresponding to a different location on the test sample, the sample interferometry data including the multiple interference signals.

In some implementations, identifying the non-linear phase variation from the sample interferometry data in the frequency domain includes: obtaining an average phase variation of at least a subset of the plurality of interference signals in the frequency domain; and obtaining a function fit to the average phase variation, in which removing the identified non-linear phase variation includes removing the function from the sample interferometry data in the frequency domain. The function fit to the average phase variation may have a quadratic form. The function fit to the average phase variation may have a polynomial of degree greater than two.

In some implementations, the methods include: transforming the compensated interferometry data back to a time domain in which the compensated interferometry data in the time domain includes multiple compensated interferometry signals; processing, by the electronic processor, the compensated interferometry data in the time domain to determine information about the test sample. Processing the compensated interferometry data in the time domain to determine information about the test sample may include determining a distance between a first interface and a second interface in the test sample. Determining the distance between the first interface and the second interface in the test sample may include: identifying, for each compensated interferometry signal of the multiple compensated interferometry signals, a first intensity peak corresponding to the first interface in the test sample and a second intensity peak corresponding to the second interface in the test sample; deriving, for each compensated interferometry signal of the multiple interferometry signals, a spacing between a position at which the identified first intensity peak occurs and a position at which the identified second intensity peak occurs. The methods may further include determining a level of parallelism between the first interface and the second interface based on the spacing derived for each compensated interferometry signal. Processing the compensated interferometry data in the time domain to determine information about the test sample may include determining a flatness of a first interface in the test sample. Processing the compensated interferometry data in the time domain to determine information about the test sample may include determining a thickness of a first plate in the test sample. Processing the compensated interferometry data in the time domain to determine information about the test sample may include determining a thickness of a thin film layer in the test sample. Two plates within the test sample may be separated by a gap, in which processing the compensated interferometry data in the time domain to determine information about the test sample includes determining a thickness of the gap between the two plates. The methods may further include generating a three-dimensional map of the gap. The methods may further include determining an average thickness of the gap.

In some implementations, the methods may further include: performing an initial scan of the stack to identify information about at least one candidate interface location within the stack; based on the information about the at least one candidate interface location within the test sample, repositioning an interferometry objective and/or the test sample so as to position a first interface of the stack adjacent to a focus plane of the measurement beam; acquiring the sample interferometry data while translating the interferometry objective and/or the test sample such that the first interface passes through the focus plane. Performing the initial scan may include: translating the interferometry objective and/or test sample relative to one another; recording from the detector array, during the translation, multiple interference signals, each interference signal of the multiple interference signals corresponding to a different location on the test sample and being sampled at a sub-Nyquist frequency of an interference fringe frequency; and determining from the multiple interference signals the at least one candidate interface location. Performing the initial scan may include: positioning the test sample at a first position relative to the interferometry objective; performing a first translation of the interferometry objective and/or the test sample relative to one another; recording from the detector array, during the first translation, a first multiple of interference signals; positioning the test sample at a second position relative to the interferometry objective; performing a second translation of the interferometry objective and/or the test sample relative to one another; recording from the detector array, during the second translation, a second multiple of interference signals; and determining from the first multiple and the second multiple of interference signals the at least one candidate interface location.

In some implementations, the at least one layer in the stack is a glass plate.

In some implementations, the stack includes a first plate, and a dielectric film formed on a first surface of the first plate.

In some implementations, the stack includes a first plate and a first diffraction grating formed on a first surface of the first plate. The first diffraction grating may be an optical coupler configured to couple light into the first plate, out of the first plate, or both into and out of the first plate. The stack may include a second diffraction grating on a second surface of the first plate. The second diffraction grating may be an optical coupler configured to couple light into the first plate, out of the first plate, or both into and out of the first plate. In some implementations, the stack may include multiple plates and a diffraction grating may be formed on one or more surfaces of the multiple plates of the stack.

In some implementations, the common source includes a white light source.

In some implementations, the non-linear phase variation from the sample interferometry data is identified over a range of wavenumbers observed by the low coherence imaging interferometry system.

In general, in some other aspects, the subject matter of the present disclosure may be embodied in systems that include: a low coherence light source configured to emit light over multiple wavelengths; an interferometer objective configured to receive light from the light source, to direct a portion of the light as a reference beam along a reference beam path to a reference surface, to direct another portion of the light along a measurement beam path to a test sample, and to combine the reference beam and the measurement beam after reflection from the reference surface and the test sample, respectively; a detector array arranged to receive the output beam from the interferometer objective and to produce sample interferometry data including information about the test sample, the sample interferometry data including multiple interference signals, each interference signal of the multiple interference signals corresponding to a different location on the test sample; an electronic processor in communication with the detector, the electronic processor being configured to transform the sample interferometry data to a frequency domain. The electronic processor is further configured to identify a non-linear phase variation from the sample interferometry data in the frequency domain, the non-linear phase variation being a result of dispersion introduced into the measurement beam by the test sample, and to remove the identified non-linear phase variation from the sample interferometry data.

Implementations of the system may include one or more of the following features. For example, in some implementations, the electronic processor is further configured to: obtain an average phase variation of at least a subset of the multiple interference signals in the frequency domain; and apply a fit to the average phase variation. The fit may have a quadratic form. The fit may be a polynomial of degree greater than two. The electronic processor may be further configured to: transform the compensated interferometry data back to a time domain wherein the compensated interferometry data in the time domain includes multiple compensated interferometry signals; and process the compensated interferometry data in the time domain to determine information about the test sample. The information about the test sample may include a distance between a first interface and a second interface in the test sample. Processing the compensated interferometry data in the time domain, by the electronic processor, to determine the distance between the first interface and the second interface in the test sample may include: identifying, for each compensated interferometry signal of the multiple compensated interferometry signals, a first intensity peak corresponding to the first interface in the test sample and a second intensity peak corresponding to the second interface in the test sample; and deriving, for each compensated interferometry signal of the multiple interferometry signals, a spacing between a position at which the identified first intensity peak occurs and a position at which the identified second intensity peak occurs. The information about the test sample may include a flatness of a first interface in the test sample. The information about the test sample may include a thickness of a first plate in the test sample. Two plates within the test sample may be separated by a gap, in which the information about the test sample includes a thickness of the gap between the two plates. The information about the test sample may include a thickness of a thin film layer in the test sample.

In some implementations, the interferometer objective includes a Michelson interferometer objective.

In some implementations, the interferometer objective includes a Mirau interferometer objective, a Linnik interferometer objective, or a wide field objective.

In some implementations, the low coherence light source includes a white light source Various aspects and implementations may have one or more of the following features and/or advantages. For example, in some implementations, the techniques disclosed herein can be used to compensate for aberrations, such as dispersion, caused by a test sample itself. In some implementations, the techniques disclosed herein can be used to compensate non-linear dispersion caused by the test sample, including, e.g., dispersion caused by test samples having thick material layers, dispersion caused by test samples having many layers, dispersion caused by test samples having multiple layers with gaps between the layers, and/or dispersion caused by surface features (e.g., couplers or gratings) within the test sample. The techniques disclosed herein may be advantageous in that they may not require a priori knowledge of characteristics of the test sample including, e.g., the refractive index of the layers within the test sample or surface features of the test sample, the thickness of the layers within or the surface features of the test sample, and/or the spacing and relative arrangement of layers within or the surface features of the test sample. The techniques disclosed herein also may be advantageous, as they do not require performing calibration of a test sample to compensate for the non-linearities prior to performing a measurement of a test sample. The details of one or more embodiments are set forth in the accompanying drawings and the description below. Other features and advantages will be apparent from the description, the drawings, and the claims.

DETAILED DESCRIPTION

Figure 1:
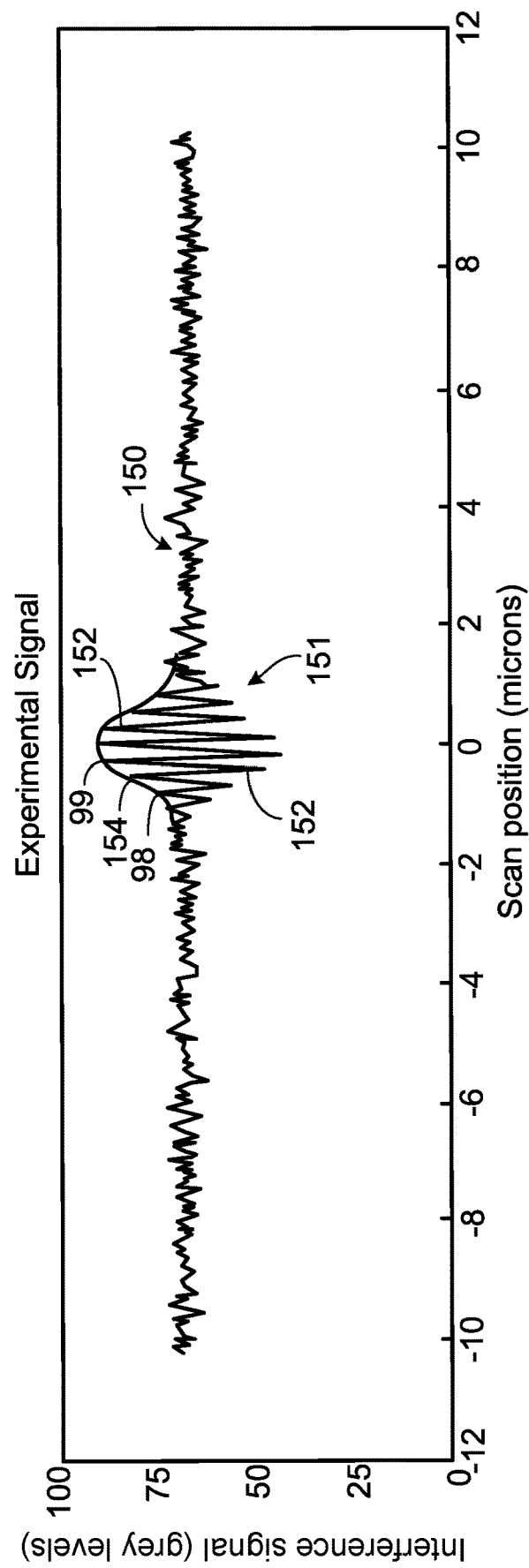
FIG. 1 is an example of a scanning white light interferometry (SWLI) signal.

FIG. 1 is a plot illustrating an example of a low coherence interference signal 150 obtained from a low coherence interferometer. The low coherence interference signal 150 includes a plurality of detector intensity values obtained from a single point of an object, e.g., a point of a silicon wafer having a single reflective interface. The intensity values vary as a function of an optical path length difference (OPD) between light reflected from the object point and light reflected from a reference object in the interferometer. Interference signal 150 is a low coherence scanning light interferometry (CSI) signal obtained by scanning the OPD, e.g., by moving an optic and/or the object to vary the optical path traveled by the light reflecting from the object or the reference light.

In FIG. 1, the intensity values are plotted as a function scan position, which correlates to the change in OPD, and map out an interference pattern 151 having a plurality of fringes 152. The fringes 152 decay on either side of a maximum according to a low coherence envelope 154. In the absence of a low coherence envelope, the fringes of an interference pattern typically have similar amplitudes over a wide range of optical path differences. The low coherence envelope 154 itself does not expressly appear in such interference signals but is shown for discussion. The location of the interference pattern along the OPD axis is generally related to a position of zero OPD, e.g., a scan position or spatial position corresponding to zero OPD between light reflected from the object point and from a reference object. The zero OPD scan position is a function of the object topography, which describes the relative height of each object point, and the orientation and position of the object itself, which influences the position of each object point with respect to the interferometer. In some implementations, the interference signal also includes contributions related to the test sample, such as dispersion and absorption caused by intervening layers of material.

The width of the low coherence envelope 154 that modulates the amplitudes of fringes 152 corresponds generally to the coherence length of the detected light. Among the factors that determine the coherence length are temporal coherence phenomena related to, e.g., the spectral bandwidth of the source, and spatial coherence phenomena related to, e.g., the range of angles of incidence of light illuminating the object. Typically, the coherence length decreases as: (a) the spectral bandwidth of the source increases and/or (b) the range of angles of incidence increases. Depending upon the configuration of an interferometer used to acquire the data, one or the other of these coherence phenomena may dominate or they may both contribute substantially to the overall coherence length. The coherence length of an interferometer can be determined by obtaining an interference signal from an object having a single reflecting surface, e.g., not a thin film structure. The coherence length may be expressed as the full width half maximum of the envelope modulating the observed interference pattern.

As can be seen from FIG. 1, interference signal 150 results from detecting light having a range of optical path differences that varies by more than the width of the coherence envelope and, therefore, by more than the coherence length of the detected light. In general, a low coherence interference signal can result from obtaining interference fringes that are amplitude modulated by the coherence envelope of the detected light. For example, the interference pattern may be obtained over a range of OPD for which the amplitude of the observed interference fringes differs by at least 20%, at least 30% or at least 50% relative to one another. For example, fringe 98 has a peak amplitude that is about 50% less than a peak amplitude of a fringe 99.

A low coherence interferometer can be configured to detect an interference signal over a range of OPD's that is comparable to or greater than the coherence length of the interferometer. For example, the range of detected OPD's may be at least 2 times greater than the coherence length (e.g., about 3 times or more, about 5 times or more, about 10 times or more, about 50 times or more, about 100 times or more greater than the coherence length). In some embodiments, the coherence length of the detected light is on the order of the height variations of features of the object, e.g., on the order of a couple of microns or less but more than a nominal wavelength of the detected light.

Figure 2:
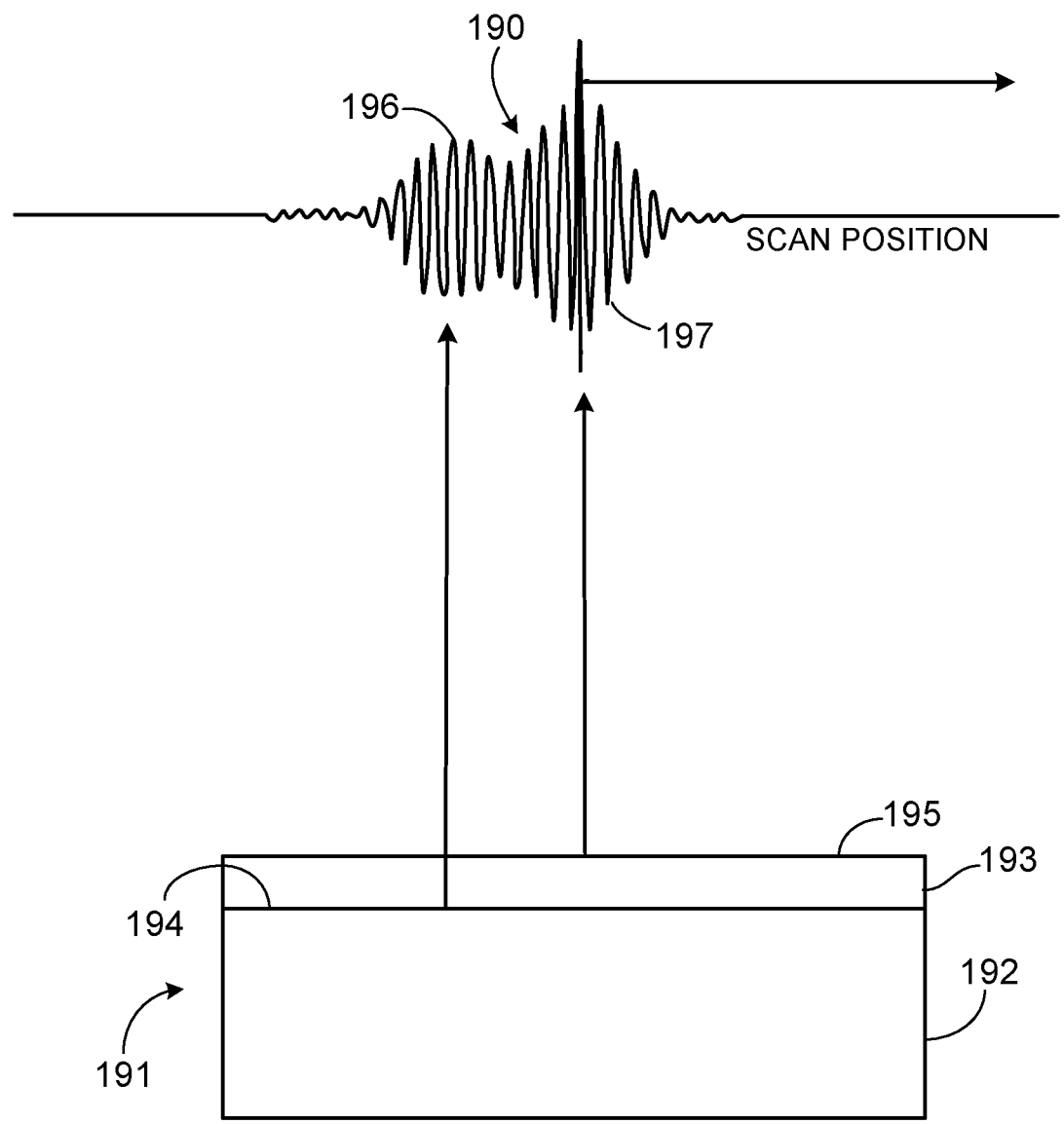
FIG. 2 is an example of a SWLI signal and corresponding test sample including a thin film.

FIG. 2 is a schematic that illustrates an exemplary interference signal 190 acquired from an object 191, which includes a substrate 192 and an overlying layer, e.g., a thin film 193. The substrate 192 and film 193 define an interface 194 therebetween. An outer surface 195 of the film 193 defines an interface between the object and its surroundings, e.g., the air, other gas, or vacuum. Interfaces are generally defined by a change in refractive index between portions of an object. An object may include multiple films, among other layers.

Interference signal 190 includes a first interference pattern 196 resulting from interface 194 and a second interference pattern 197 resulting from interface 195. First interference pattern 196 and second interference pattern 197 are overlapping. For example, maxima of the interference patterns (196, 197) are separated by an OPD less than the coherence length of the interferometer and patterns (196, 197) are not separated by a region of zero intensity. Overlapping interference patterns can yield erroneous results because the overlapping interference patterns distort one another.

Figure 3:
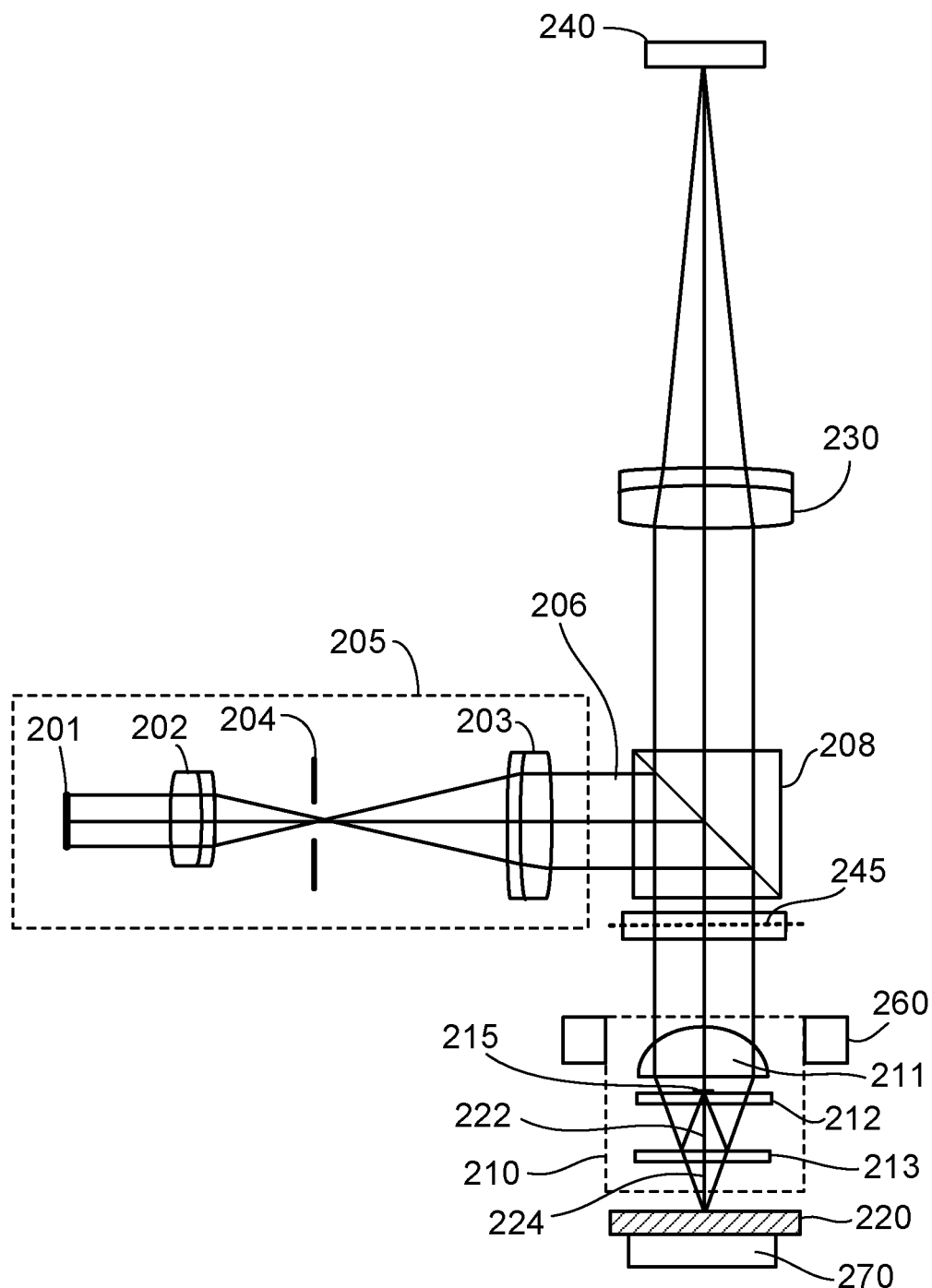
FIG. 3 is a schematic illustrating an example of a Mirau-type scanning interferometer.

Examples of interferometers that can be configured as low coherence scanning interferometers include, but are not limited to, Michelson, Linnik and Mirau interferometers. FIG. 3 shows a scanning interferometer of the Michelson type. Here, a source module 205 provides illumination light 206 to a beam splitter 208, which directs it to a Mirau interferometric objective assembly 210. Illumination light 206 may include broadband light (e.g., white light) from a broadband source (e.g., a continuous broadband source) having spectral properties that produce a desired coherence length. Examples of the broadband source include, but are not limited to, light emitting diodes, halogen lamps, arc lamps, super luminescent diodes or incandescent light sources, among others. Assembly 210 includes an objective lens 211, a reference flat 212 having a reflective coating on a small central portion thereof defining a reference mirror 215, and a beam splitter 213. During operation, objective lens 211 focuses the illumination light towards a test sample 220 through reference flat 212. Beam splitter 213 reflects a first portion of the focusing light to reference mirror 215 to define reference light 222 and transmits a second portion of the focusing light to test sample 220 to define measurement light 224. Then, beam splitter 213 recombines the measurement light reflected (or scattered) from test sample 220 with reference light reflected from reference mirror 215, and objective 211 and imaging lens 230 image the combined light to interfere on detector (e.g., a multi-pixel camera) 240. The measurement signal(s) from the detector is sent to a computer (not shown).

The scanning in the embodiment of FIG. 3 involves a piezoelectric transducer (PZT) 260 coupled to Mirau interferometric objective assembly 210, which is configured to scan assembly 210 as a whole relative to test sample 220 along the optical axis of objective 211 to provide scanning interferometry data at each pixel of the camera (e.g., $I/(\zeta,h)$, where I is the interferometer data representative of signal intensity, $\zeta$ is the interferometer scan coordinate orthogonal to the object surface, and h is the surface height). Alternatively, the PZT may be coupled to the test sample rather than assembly 210 to provide the relative motion there between, as indicated by PZT actuator 270. In certain embodiments, the scanning may be provided by moving one or both of reference mirror 215 and beam splitter 213 relative to objective 211 along the optical axis of objective 211.

Source module 205 includes a spatially extended source 201, a telescope formed by lenses 202 and 203, and a stop 204 positioned in the front focal plane of lens 202 (which coincides with the back focal plane of lens 203). This arrangement images the spatially extended source onto a pupil plane 245 of Mirau interferometric objective assembly 210, which is an example of Koehler imaging. The size of stop 204 controls the size of the illumination field on test sample 220. In some embodiments, the source module may include an arrangement in which a spatially extended source is imaged directly onto the test sample, which is known as critical imaging. Either type of source module may be used with other types of interferometer, such as a Linnik-type scanning interferometry system.

Figure 4:
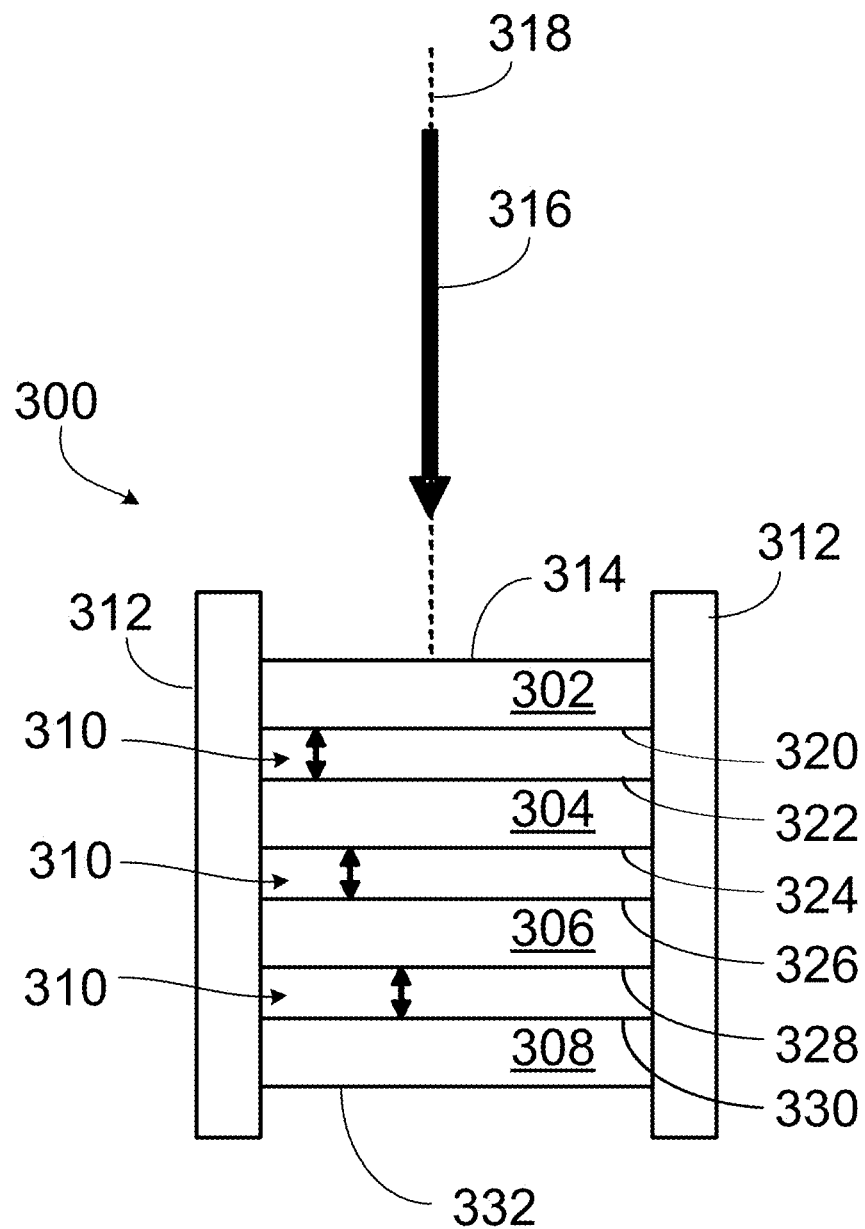
FIG. 4 is a schematic illustrating an example of an optical device.

FIG. 4 is a schematic illustrating an example of a device 300 that may be analyzed using a scanning interferometer, such as the interferometers disclosed herein. Device 300 may be used, e.g., in artificial reality (AR)/virtual reality (VR) devices as a waveguide structure that, when placed in front of a user's eye, carry image light information from the AR/VR device periphery and redirect the light to the eye to produce data or image overlays without blocking normal vision. Device 300, also referred to herein as test sample, includes multiple layers arranged in a stack. In the present example, the layers include plates 302, 304, 306, 308. A first plate 302 may include an upper first surface 314 and a lower second surface 320. Similarly, second plate 304 may include an upper first surface 322 and a lower second surface 324, third plate 306 may include an upper first surface 326 and a lower second surface 328, and fourth plate 308 may include an upper first surface 330 and a lower second surface 332. Although four plates are shown in FIG. 4, more or less number of plates may be positioned in the device 300. The plates are held in place by a sample holder 312. One or more plates within the stack may be separated from an adjacent plate in the stack by a corresponding gap (e.g., gaps 310). The stack of plates also may include diffractive optics and/or coatings (not shown) on either end of the stack or formed throughout stack on individual plates. The diffractive optics may be used as optical couplers (e.g., holographic input and out couplers) for coupling light into and/or out of the individual plates, which in turn, may be used as waveguides for moving light around.

In some implementations, e.g., for AR/VR applications, it may be useful to identify and control the parallelism of the plates within the device 300, as well as to measure and control other device properties, such as the flatness of one or more surfaces of the plates, surface roughness of one or more of the plates, and the distance between plates (e.g., gap thickness). CSI offers several advantages as a metrology technique for measuring stacked devices, such as device 300. For instance, since CSI often relies on the use of continuous broadband sources (e.g., light emitting diodes, halogen lamps, incandescent sources, among others), it can be straightforward to tailor the incident light spectrum using standard optical components, such as optical filters. Furthermore, in CSI, the broadband spectrum naturally suppresses interference from cavities whose optical path difference exceeds the coherence length of the source, which can be of particular concern in optical devices having layers separated by gaps.

Nonetheless, using CSI to measure surface topography of optical devices having multiple layers separated by gaps, such as device 300, can be challenging for several reasons. For example, when interfaces are close together, the proximity of the interfaces may produce overlapping interference pattern, leading to distortion of the interference signal. In some cases, multiple intervening layers increase the amount of signal dispersion and absorption. For example, for a relatively large stack of glass plates, light may be lost from absorption and scattering, causing the amplitude of peaks within the interference signal to dampen. In some cases, dispersion may be a result of stresses resulting from applied surface features and/or coatings, as well as the stack assembly process. For example, in some implementations, pieces of glass are coated with holographic input and output couplers, and glued to the assembly, all of which may cause the plates to bend, and possibly even come into contact with one another. Dispersion caused by such effects can exhibit itself in a measured signal as phase delays. If dispersion is non-linear, the net effect can be a loss of fringe contrast and a broadening of the coherence envelope in the low coherence signal. The thicker the stack of layers, the worse the dispersion effects may be as the interferometer scans deeper into the stack. Since the foregoing signal non-linearities depend on the dispersion from all the intervening layers within the stack as well as the dispersion characteristics from the surface features, and since such information may be unknowable in advance of performing a measurement, it is challenging to perform any sort of pre-calibration to compensate for the non-linearities.

The present disclosure is directed to techniques and systems for performing metrology of such multi-layer stacks, while compensating for the non-linearities that lead to dispersion and/or other adverse influences on the interference signal. In general, in certain aspects, the present disclosure covers techniques that include 1) transforming sample interferometry data obtained from a test sample having a multi-layer stack to a frequency domain, 2) identifying, in the frequency domain, a non-linear phase variation from the sample interferometry data, in which the non-linear phase variation is a result of dispersion introduced into a measurement beam by the test sample, and 3) removing the identified non-linear phase variation from the sample interferometry data in the frequency domain to producing compensated interferometry data. The compensated interferometry date then is transformed back into the time domain, from which information about the test sample, such as surface topography and surface separation, may be extracted. Alternatively, or in addition, metrology data may be extracted from the compensated interferometry data prior to transforming back to the time domain.

Figure 5:
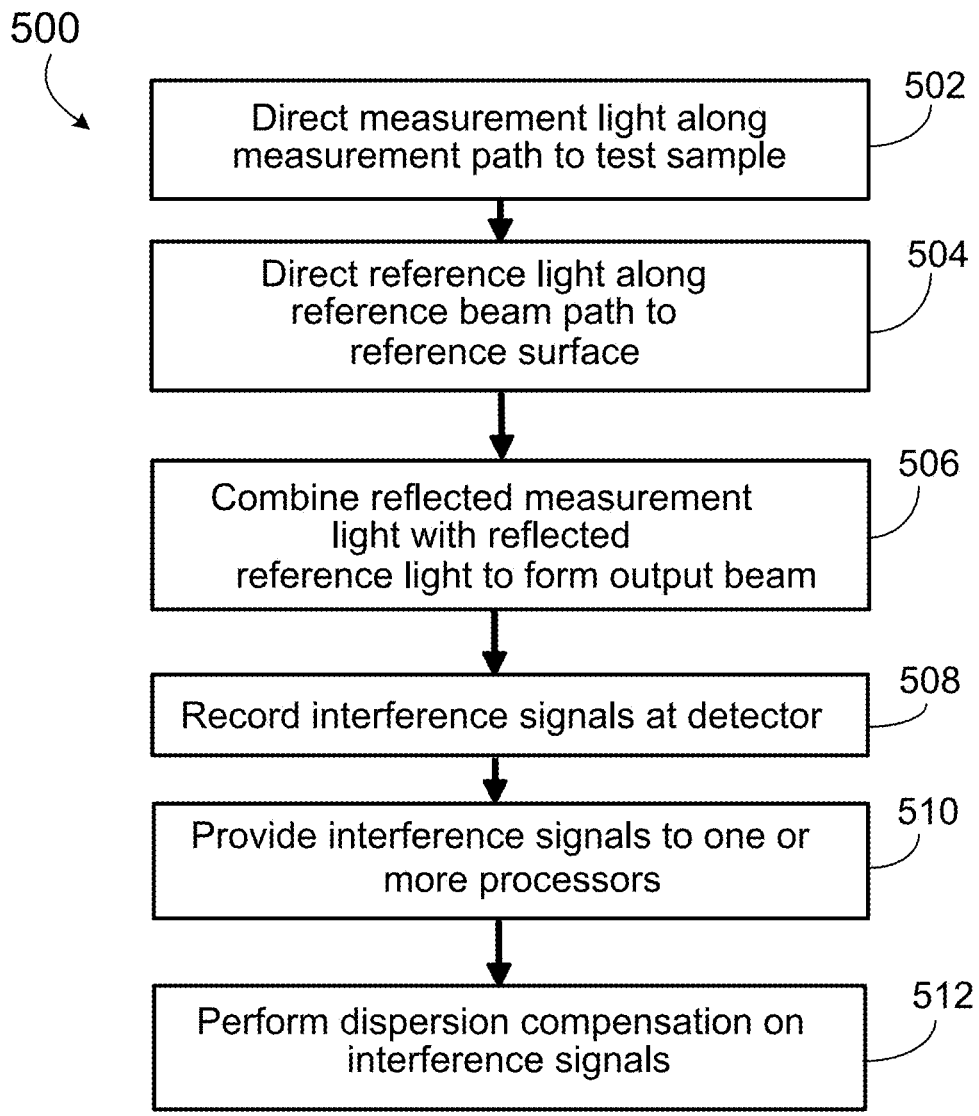
FIG. 5 is a flow-chart illustrating an example of a process for measuring surface topography of an optical device having a multi-layer stack.

FIG. 5 is a flow-chart illustrating an example of a process (500) for measuring surface topography of an optical device having a multi-layer stack, such as device 300, using a CSI interferometer, such as the Mirau interferometer of FIG. 3. As explained herein, the source 201 of the Mirau interferometer may be a broadband source, including a source having a relatively large bandwidth (e.g., about 100 nm or more) and may include, e.g., a light emitting diode, a halogen lamp, an arc lamp, incandescent sources, among others. For instance, the light source may be in the visible portion of the electromagnetic spectrum (e.g., white light).

Measurement light from the source 201 is directed (502) along a measurement beam path so as to be incident on the test sample 220, which may include, e.g., the device 300 having multiple layers arranged in a stack. For instance, as shown in FIG. 4, measurement light 316 is directed toward a first surface 314 of the device 300 along an optical axis 318. The optical axis 318 may be normal to the first surface 314 of the device 300. As the light 316 passes through the device 300, a portion of the light 316 reflects at each interface between regions of dissimilar refractive index.

As explained herein, the layers of the device 300 may include plates that are at least semi-transparent to one or more wavelengths of the measurement light. For example, the light being used can travel through the plate material and surfaces with losses from absorption or scatter small enough so the returning light can produce an interference signal with sufficient signal to noise to achieve the desired metrology performance. The plates may include, e.g., glass plates. One or more layers within the stack may be separated from an adjacent layer in the stack by a gap, as shown in FIG. 4. The gap thickness (e.g., the average distance between opposite facing surfaces of two adjacent plates within the stack) may be between about several hundred nanometers to about several millimeters (e.g., greater than at least about 100 nm, greater than at least about 1 micron, greater than at least about 10 microns, greater than at least about 100 microns, greater than at least about 1 millimeter). One or more plates within the stack may have thicknesses ranging between several hundred microns to several tens of millimeters or more (e.g., greater than at least about 100 microns, greater than at least about 500 microns, greater than at least about 1 millimeter, greater than at least about 5 millimeters, greater than at least about 10 millimeters). In some implementations, the plates are coated with a thin single- or multi-layer film of one or more dissimilar materials. For example, the plates may include one or more anti-reflective or high-reflection coatings formed from a single film or a multi-layer film of dielectric materials having alternating refractive indexes. In some implementations, the surfaces of the plates are modified to include particular features. For example, the surface of a plate may be modified to include holographic optical couplers using gratings (e.g., diffraction gratings) etched, embossed or deposited onto a surface of the plate. In some implementations, a first surface of a plate includes a first optical coupler and a second opposite surface of the plate includes a second optical coupler. The optical couplers may be used to couple light into the plate, out of the plate, or both into and out of the plate. Multiple plates each may include films and/or couplers as described herein.

Referring again to FIG. 3, light from the broadband source 201 is split by a beam splitter 213 into 1) a first portion focused to reference mirror 215 to define reference light 222 of a reference beam path and 2) a second portion focused to test sample 220 to define measurement light 224 of a measurement beam path. The reference light 222 is directed (504) along the reference beam path so as to contact a reference surface (e.g., reference flat 212). Then, the measurement light reflected (or scattered) from test sample 220 is combined (506) with reference light from reference mirror 215 to form an output beam. Imaging lens 230 and objective 211 image the combined light to interfere on a detector array 240 having multiple detector elements (e.g., a multi-pixel camera) to produce a measurement signal. In some implementations, the beam-splitter may be manufactured so that the reference light and measurement light pass through an equal amount of glass, thereby reducing dispersion related to contrast broadening. The measurement signal(s) from the detector is sent to a computer (not shown). Interference occurs when the difference between the optical paths of the two legs are within the illumination coherence length. To obtain interference from each of the surfaces of the test sample 220, the test sample 220 and/or components of the interferometer is (are) scanned along the optical axis 318 (see FIG. 4) using a motorized stage so that one or more surfaces of the test sample 220 in turn satisfies the coherence condition.

Multiple interference signals may be recorded (508) from the detector array, in which each interference signal of the multiple interference signals corresponds to a different location on the test sample and is recorded by a different detector element, to provide sample interferometry data. In an example measurement, the test sample 220 is held in an adjustable mount that provides means to align the nominal surface normal of the test sample 220 to the interferometer optical axis 318. An alignment process might include, for example, imaging the source reflection from the test sample surfaces and from the reference surface onto the detector elements of the detector 240. Once aligned, the motorized stage is set so that the stack surface closest to the interferometer is just outside (and to the right of) the object space focus plane. The stage then moves the part towards the interferometer at a constant velocity while the camera acquires interference images. As each surface passes through the equal path region, the interference occurs and the camera records interferograms, which include, e.g., an areal intensity pattern produced by interference from two wavefronts. The interferometer may be configured so that best focus occurs at an object plane that satisfies the equal optical path condition between the reference leg and the test leg.

Interferograms are taken by the detector at various stage locations and are subsequently provided (510) to one or more electronic processors (not shown) that, in turn, perform dispersion compensation (512) on the interference signals and process the corrected interference signals using CSI methods, such as peak-coherence contrast detection methods, least-squares template analysis, or frequency-domain analysis. Further information on CSI methods for performing surface topography analysis may be found, e.g., in U.S. Pat. Nos. 5,398,113, 5,953,124, 8,045,175, and 7,522,288, each of which is incorporated herein by reference in its entirety. For instance, assuming the scan velocity, camera rate and the mean wavelength of the illumination light are known, the interferograms from each surface then may be analyzed to obtain the surface topography. If the acquisition continuously acquires interferograms throughout the scan, relational information between all the surfaces can be retained.

Figure 6:
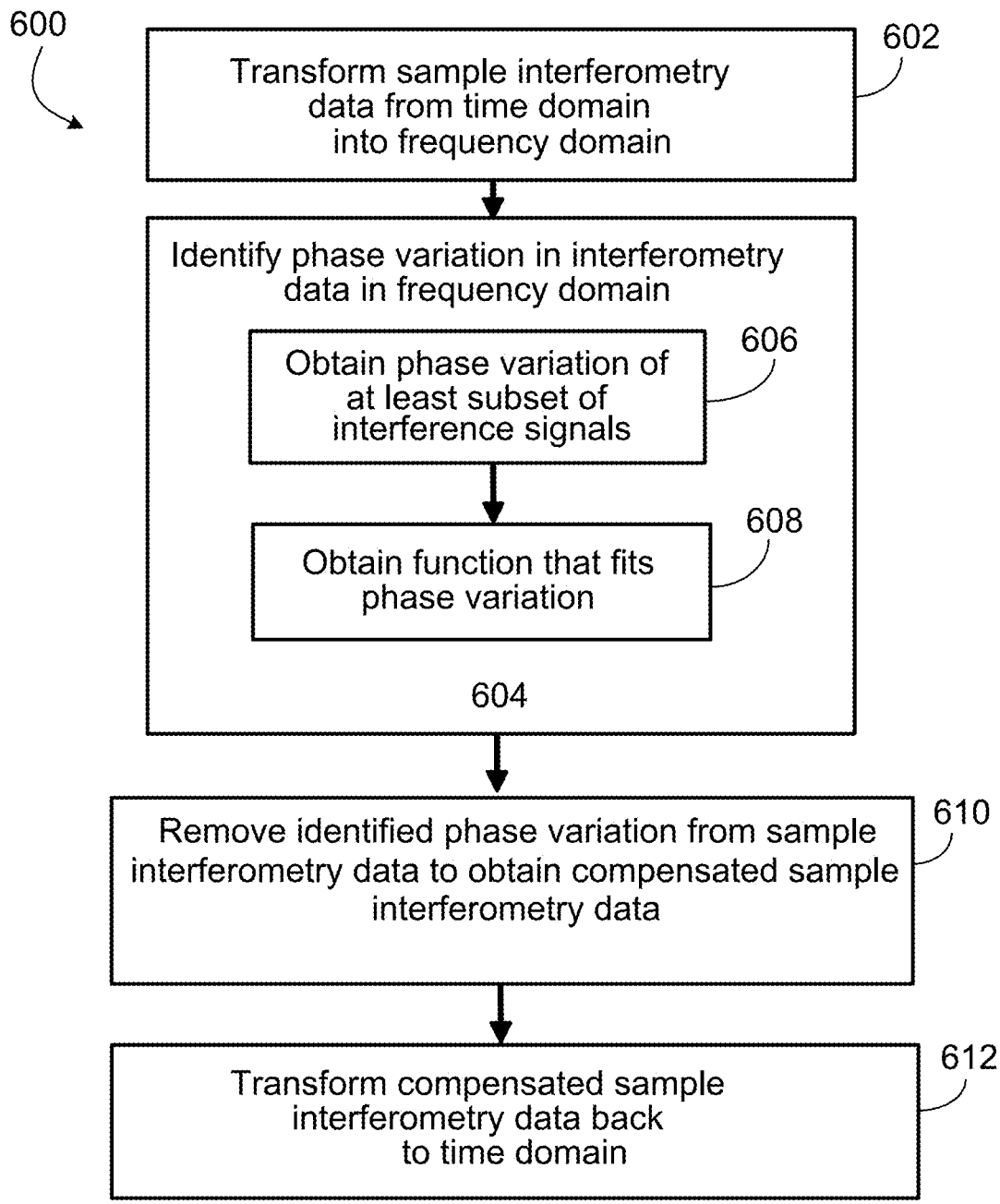
FIG. 6 is a flow chart that illustrates an example process for compensating dispersion.

FIG. 6 is a flow chart that illustrates an example process (600) that may be performed by the one or more processors to compensate dispersion and other effects caused by the test sample that influence the shape of the interferograms. In a first step (602), the one or more processors of the interferometer system transforms the sample interferometry data from a time domain into a frequency domain.

For example, without wishing to be bound by theory, a discretely-sampled low coherence interferometry signal, I, can be expressed as an incoherent sum of interference patterns over a range of frequencies K as follows:

$$I_j = \sum_{z=0}^{N-1} q_{j,v} \exp(i\zeta_z K_v) \quad (1)$$

The range of frequencies is a consequence of both the spectral bandwidth of the interferometry system source and geometric effects of incoherent illumination at nonzero numerical aperture (NA). In Eq. (1), $\zeta$ is the interferometer scan coordinate normal to the object surface, N is the number of samples taken during the scan, q is a Fourier coefficient, j is the index of the element of the detector array, and z, v are the indices for the scan position $\zeta$ and frequency K, respectively. Assuming uniform sampling over a scan range that encompasses the entire envelope of the interference signal I, the inverse relationship can be expressed as $$q_{j,v} = \frac{1}{N}\sum_{z=0}^{N-1} I_j \exp(i\zeta_z K_v). \quad (2)$$

The Fourier coefficients may be obtained by performing, for example, a forward Fourier Transform on the interference signal. The Fourier coefficients may be expressed in the form of complex numbers that represent the interferometry data in terms of wavenumbers and corresponding phases.

In some cases, prior to transformation of the interference data to the frequency domain, a DC component from the interference data is removed. Alternatively, or in addition, interference signals corresponding to a selected surface of the test sample are isolated if they are separated enough. If they are not separated enough in the time domain due to dispersion, and if the dispersion experienced by both surfaces is nominally the same, dispersion compensation can be performed to improve the time domain separation. As an example, interference signals from the interferometry data having a signal intensity above a pre-determined value may be identified as corresponding to an interface of a selected surface of the test sample. The interference signals having signal intensity greater than (or greater than or equal to) the predetermined value may be isolated by setting a value for other remaining interference signals to zero. Alternatively, or in addition, the time-domain interference signals (e.g., the isolated interference signals) may be time-shifted prior to transforming them into the frequency domain. For example, for each pixel, the signal data in the time domain may be time-shifted so that the peak amplitude of the signal occurs at the beginning of the data set. This may be accomplished, for example, using a circular buffer (or ring shift register) technique in which data that is removed from one side of the signal is copied to the other side of the signal. This removes the linear phase term in the Fourier components.

Following transformation of the sample interferometry data to the frequency domain, a non-linear phase variation is identified (604) from the sample interferometry data in the frequency domain. The non-linear phase variation may be a result of dispersion introduced into the measurement beam by the layers and/or surface features on or within the test sample, as described herein. Identification of the non-linear phase variation includes deriving the non-linear phase variation from the sample interferometry data itself, rather than from calibration information or from expected characteristics of the test sample. Identifying the non-linear phase variation may include, e.g., obtaining (606) a phase variation of at least a subset of the multiple interference signals in the frequency domain. If dispersion is or can be assumed to be spatially independent, interference signals from a single detector element or multiple detector elements may suffice to reduce measured phase noise over a region where the dispersion is expected to be constant. If spatial independence of dispersion cannot be assumed, then the dispersion is evaluated for each pixel individually.

As an example, most of the useful information in the Fourier-transformed data may be contained in a region in which the relative magnitudes of the Fourier coefficients are large. Therefore, obtaining (606) the phase variation of at least the subset of interference signals may include using the one or more processors to calculate and unwrap the phase of a subset of Fourier components with sufficiently high amplitude, e.g., selecting Fourier components at wavenumbers having at least a predetermined signal to noise (S/N) ratio. A S/N ratio selection may depend on the data recorded. A noisy data region might require a low S/N ratio to avoid dropouts (unmeasured points), coupled with averaging or post processing. A clean data region might only need a higher S/N ratio to provide acceptable measurements. For example, in some implementations, nonlinear (dispersive) phase terms with acceptable precision may be measured using Fourier component S/N ratios of less than 2. Alternatively, in some implementations, the S/N ratios may be greater than 5. The phase variation from the sample interferometry data may be identified over a range of wavenumbers observed by the low coherence imaging interferometry system. An effective range depends on the illumination spectral bandwidth. For example, a larger bandwidth may provide a larger range. In some implementations, obtaining (606) the phase variation includes deriving an average (e.g., mean, mode, or median) phase variation of at least the subset of interference signals. In some implementations, the phase variation can be derived individually and independently for each location in the field (e.g., across multiple pixel elements of the detector). However, averaging multiple locations can be a useful way to reduce measurement error if the dispersion is uniform across a field. Additional information regarding evaluating phase information within interference data may be found, e.g., in U.S. Pat. No. 5,398,113 (e.g., at 9:44-10:54) and U.S. Pat. No. 7,522,288 (e.g., at 11:49-13:12), each of which is incorporated herein by reference in its entirety.

Identifying the non-linear phase variation may further include obtaining (608) a function that fits the phase variation. For example, as explained above, an average phase variation over the selected wavenumbers may be derived for all pixels, or a subset of pixels, in a region. In some implementations, multiple non-linear phase variations may be obtained for multiple regions across the sample surface. For instance, multiple average phase variations over the selected wavenumbers may be derived, each average being derived from a different subset of pixels corresponding to different respective regions of the sample surface. In some implementations, the selected wavenumbers may differ for each region that a corresponding phase variation is derived. Dispersion caused by intervening layers of material and/or by the stresses induced in the test sample often may result in a quadratic phase non-linearity. Thus, the function that fits the phase variation may have a quadratic form, such as $x^2$. The non-linear phase variation may, however, have a form other than quadratic. Furthermore, other functions may be fit to the phase variation, such as functions having a polynomial of degree greater than two, exponential functions, logarithmic functions, spline fits, Gaussian fits, among others.

Following identification of the non-linear phase variation, the identified non-linear phase variation from the sample interferometry data in the frequency domain is removed (610) to produce compensated interferometry data. For instance, removing (610) the identified non-linear phase variation may include subtracting, for each pixel or a subset of the pixels, the fitted function data (e.g., the best fit) from the sample interferometry data. In some implementations, the non-linear phase information that is identified may be further analyzed to provide useful information, including material characteristics such as, e.g., group-velocity refractive index (since material refractive index is a nonlinear function of wavenumber) and/or thickness if the layer material is known, as well material defects such as, e.g., contaminants that affect absorption and dispersion.

After removing the non-linear phase variation, the compensated sample interferometry data may be transformed (612) back to the time domain. The one or more processors then may process the compensated interferograms to provide metrology information such as topographical maps of the surfaces using CSI methods, as disclosed herein. Further examples of techniques for producing topographical maps using CSI data may be found, e.g., in U.S. Pat. Nos. 5,953,124, and 7,522,288, each of which is incorporated herein by reference in its entirety. In this way, the dispersion contribution from the test sample to the interference signal is evaluated using the interference signal data itself, and no advance knowledge about the intervening material (e.g., refractive index, dispersion characteristics or layer thickness) is required. Alternatively, or in addition, metrology information, including topography maps may be derived from the compensated interferometry data in the frequency domain using frequency domain methods (such as those described, e.g., in U.S. Pat. No. 5,398,113, the contents of which are incorporated herein by reference in their entirety). Though the current implementation assumes the dispersion properties are the same across the field, the procedure can be extended for field dependent dispersion by evaluating the non-linear term (e.g., the quadratic term) as a function of field position.

In an example implementation, the processor may determine from the compensated interferometry data the distance between a first interface and a second interface in the test sample. Determining a distance between a first and second interface may include, e.g., identifying, for each compensated interferometry signal of the multiple compensated interferometry signals, a first intensity peak of a first interference pattern corresponding to the first interface (e.g., any of interfaces 314, 320, 322, 324, 326, 328, 330, or 332 of device 300) in the test sample and a second intensity peak of a second interference pattern corresponding to the second different interface (e.g., any of interfaces 314, 320, 322, 324, 326, 328, 330, or 332 of device 300) in the test sample. Then, for each compensated interferometry signal of the multiple interferometry signals, the one or more processors may derive a spacing between a position at which the identified first intensity peak of the first interference pattern occurs and a position at which the identified second intensity peak of the second interference pattern occurs. Since each signal is obtained from a different detector element (e.g., pixel) corresponding to a different location along the interfaces, the spacing may be averaged among the different signals to provide an average distance between the first interface and the second interface. This distance may correspond, e.g., to an average gap thickness between layers within the test sample. For example, the distance may be an average gap thickness between a first plate and a second plate within the test sample (e.g., the gap distance between plate 302 and 304 in device 300, the gap distance between plate 304 and 306 in device 300, the gap distance between plate 306 and 308 in device 300). Alternatively, the distance may correspond to an average thickness of a layer formed on a plate in the test sample. For example, the distance may correspond to the thickness of a thin film dielectric layer formed on a surface of a plate in the test sample. Alternatively, the distance may correspond to a thickness of a plate in the test sample (e.g., the thickness of plate 302, 304, 306 or 308 of device 300).

In some implementations, the one or more processors may determine a level of parallelism between the first interface and the second interface based on the spacing derived for each compensated interferometry signal. For example, the one or more processors may be used to output the distance data for each detector element (e.g., pixel) as a topography map that shows how a gap thickness (e.g., any of gaps 310 shown in device 300) between two plates within the test sample is either uniform or non-uniform across the gap. For instance, the topography map may show the difference in areal surface topographies of the first and second interfaces. The topography map may be output to a display. In some implementations, the one or more processors are configured to determine other information from the topography map, including, e.g., a root-mean-square difference between the first and the second interface, a peak-valley difference between the first and the second interface, or any other parameterization of the topography map. In some implementations, the one or more processors may determine a level of flatness of one or more interfaces (e.g., any of interfaces 314, 320, 322, 324, 326, 328, 330, or 332 of device 300) within the test sample. For example, the surface form of an interface in the test sample may be obtained relative to the reference flat surface of the interferometer system.

In some implementations, the amount of data acquired using the techniques disclosed herein can be very large and take a significant amount of time to acquire, especially if the test sample is constructed to include multiple relatively thick plates having gaps between them. For example, for a test sample having a stack made of eight 0.5 mm thick plates with 50 micron separation between plates, an overall stack physical thickness is 4.35 mm. For a CSI sampling rate along the scan direction equal to ⅛ of a wavelength (¼ of a fringe) per camera frame, and a 500 nm mean source wavelength, over 70,000 camera frames would be needed to scan through the stack and acquire all surfaces. Assuming each image is 500×500 pixels digitized at 8 bits, this corresponds to about 17.5 GB of data. Additionally, for a camera operating at 100 Hz, the process may require on the order of 700 seconds (11.7 min).

In some implementations, acquisition throughput may be increased by performing an initial quick scan at a higher translation rate to identify information about at least one candidate interface location within the stack. Based on the information about the at least one candidate interface location within the test sample, the interferometry objective and/or the test sample may be repositioned so as to position the at least one candidate interface of the stack adjacent to a focus plane of the measurement beam. More detailed information then may be obtained by translating the interferometry objective and/or the test sample such that the at least one candidate interface passes through the focus plane at a slower rate and/or sample interferometry data is acquired at a higher acquisition rate.

For example, in some implementations, the quick scan may be performed via "Sub-Nyquist" acquisitions. A Sub-Nyquist acquisition entails increasing the CSI scan speed and illumination intensity over a standard CSI acquisition, typically by an odd integer multiple (3, 5, 7, . . . ) (the Sub-Nyquist multiple), while simultaneously shuttering the camera to reduce the frame integration by the same inverse multiple (⅓, ⅕, ⅐, . . . ). The effect is to reduce the acquisition time and amount of data by the Sub-Nyquist multiple by sparsely sampling the interference, while the shuttering and intensity increase minimizes interference signal contrast loss. The price paid for this type of acquisition is an increase in environmental sensitivity and measurement noise; an acceptable tradeoff in some circumstances. Additional information on performing quick scans may be found, e.g., in U.S. Pat. No. 5,398,113 and *High-speed non-contact profiler based on scanning white light interferometry*, L. Deck and P. de Groot, Appl. Opt. 33(31), 7334-7338 (1994), each of which is incorporated herein by reference in its entirety.

From the data obtained using the quick initial scan, at least one candidate interface location within the stack may be identified. The at least one candidate interface may be identified by locating portions of the interferometry signal having a peak local amplitude. For example, if the test sample is composed of multiple plates having gaps between adjacent plates, and one is interested in determining the gap separation between the plates, but not other relational information about the plate surfaces, a high-speed scan (e.g., a sub-Nyquist scan) may be initially performed through the test sample to identify the stage location of all interfaces. The stage locations corresponding to interfaces occur at positions within the time-domain interference signals at which the amplitude reaches a local maximum. Peaks in the signal amplitude spaced apart by approximately the expected plate gap distance then may be marked as candidate surfaces of the plates. Subsequently, surfaces bounding an identified gap may be measured with a standard scan proceeding at a slower rate than the initial scan (e.g., at a rate equal to or greater than the Nyquist frequency) and a new interferometry signal recorded that covers the opposite facing surfaces of two different plates within the stack. The dispersion compensation techniques disclosed herein then may be performed on the newly recorded signal, and CSI analysis applied to the corrected data to obtain a more accurate location of the two surfaces. If the scan surfaces are close enough together that the interferometry data can be acquired with a single acquisition scan, then the gap thickness variation may be determined by subtracting the difference between the scan positions corresponding to the surface locations (i.e., the local peaks in signal amplitude). It is possible to estimate how large an amplitude is needed to identify a peak if the rms variability of a part of the scan where a peak is known not to exist is obtained. The rms variability provides an idea of statistical characteristics of the "background." A peak may be defined, for example, as a signal that must be some identified multiple of standard deviations above background, e.g., a value of 4 or 6.

In some implementations, the initial scan data is used to quickly identify a location of a candidate surface so that a more accurate analysis of the candidate surface may be performed. For instance, following the initial quick scan as described herein, the interferometer and/or test sample may be repositioned such that an identified candidate surface is located near a focal plane of the interferometer system. From this new position, a standard scan proceeding at a slower rate than the initial scan (e.g., at a rate equal to or greater than the Nyquist frequency) may be performed and a new interferometry signal recorded. The dispersion compensation techniques disclosed herein then may be performed on the newly recorded signal, and CSI analysis applied to the corrected data to obtain and output information about the candidate surface. The initial quick scan is described above as being used for initial identification of candidate surfaces, after which a second scan of the candidate surface may be performed to obtain more detailed information. However, in some implementations, the quick scan may provide sufficient detail regarding candidate surfaces without the need to perform a second additional scan.

Exemplary Applications

The low coherence interferometry methods and systems described herein may be used for any of the following surface analysis problems: areal surface topography, texture measurement, surface form measurement, relational metrology of multiple surfaces (thickness and parallelism), surface defect detection, simple thin films; multilayer thin films; stacked multilayer objects with gaps between layers; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon. For the case of thin films, the variable parameter of interest may be the film thickness, the refractive index of the film, the refractive index of the substrate, or some combination thereof. An exemplary application is discussed next.

AR/VR Optical Devices

As explained herein, AR/VR applications may employ stacks containing multiple parallel plates, in which the parallel plates within the stack have features and coatings applied to their surfaces to act as waveguides such that, when the device is placed in front of a user's eye, light information from the device periphery is carried and redirected to the eye to produce data or image overlays without blocking normal vision. To maintain high quality images, it can be important to achieve good parallelism between plates, to ensure certain surfaces have a desired flatness, and to maintain specific separation distances between the plates during manufacturing, among other factors. In some cases, the plates used in these optical devices are relatively thick, leading to dispersion effects as the interferometer scan probes deeper into an optical plate.

Figure 7A:
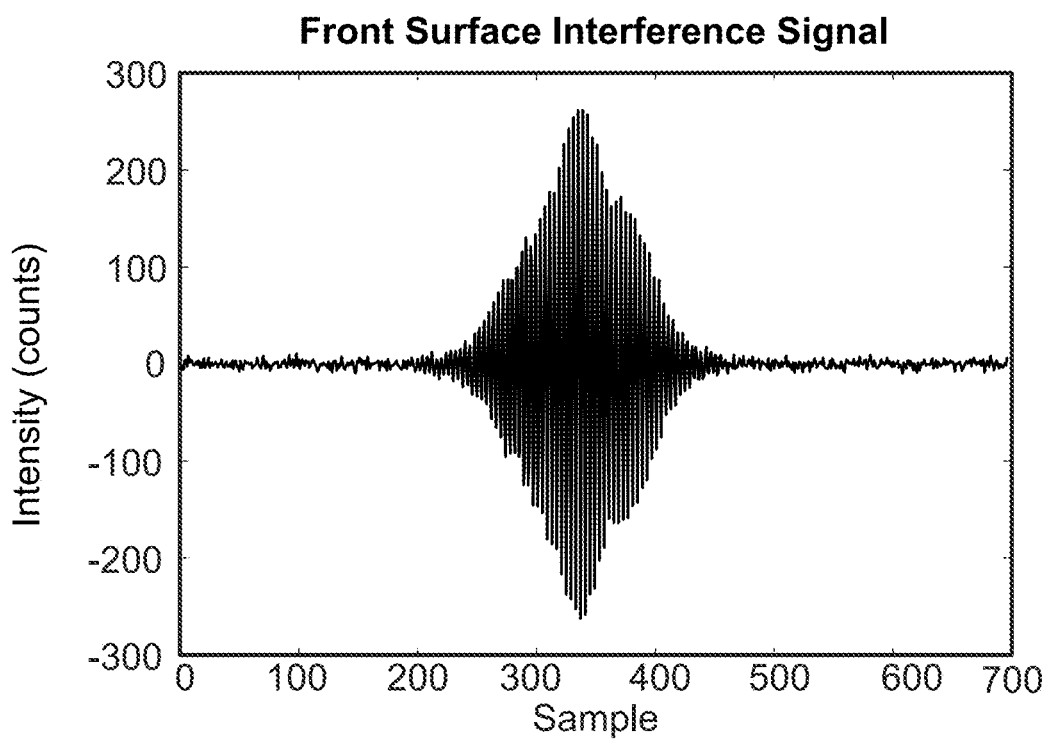
FIG. 7A is a plot depicting a time-domain interference signal for a surface of a glass plate.
Figure 7B:
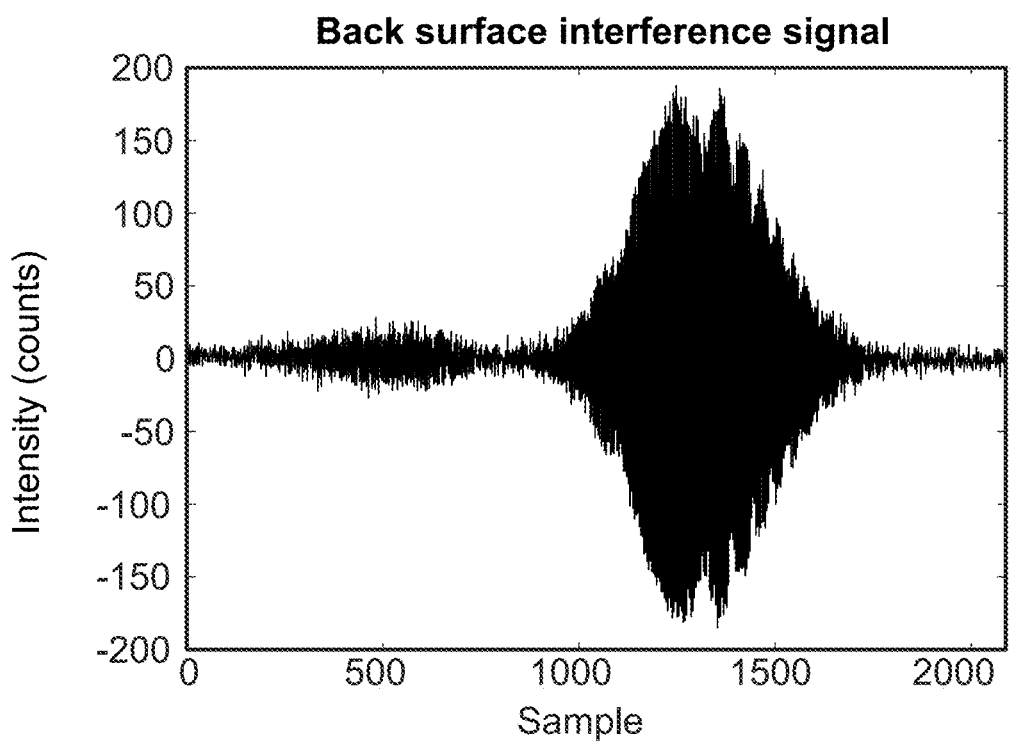
FIG. 7B is a plot depicting a time-domain interference signal for a surface of a glass plate.

For example, FIGS. 7A and 7B are plots depicting the time-domain interference signals obtained from a single detector pixel for a parallel glass plate having a thickness of 6.25 mm. The interferometer system used to obtain the data illustrated in FIGS. 7A-7B was a wide field objective design, such as the interferometer design disclosed in U.S. Pat. No. 8,045,175, the subject matter of which is incorporated herein by reference in its entirety. The interferometer system employed a stepper motor stage that provided uniform motion to 500 microns/sec velocities. The optical source was a 10 W Dental Blue light emitting diode having a mean wavelength of 460 nm, and a full width half maximum of about 25 nm. The source provided an approximately Gaussian shaped dispersion-free contrast envelope with a 3.5 micron sigma.

FIGS. 7A and 7B correspond to time-domain interferometry data obtained from a single pixel of the detector of the interferometer system for a front surface and back surface, respectively, of the optical plate. That is, the interferometer scanned through glass plate starting from the front surface to the back surface. The horizontal axis represents the sample number and corresponds to the scan position (with the initial position being reset to 0 for each sample signal), whereas the vertical axis represents the signal intensity. The total scan length of FIG. 7A was ~40 microns while for FIG. 7B the scan length was ~120 microns to account for dispersion broadening. As is evident from FIG. 7B, the back surface measurement significantly broadens the coherence width of the interference signal, whereas the signal shown in FIG. 7A corresponding to the front surface exhibits a more well-defined interference pattern envelope. The broadening of the coherence width in FIG. 7B is due to the dispersion of the intervening glass between the front and back surfaces of the glass plate. The smaller coherence peak observed around sample 500 of the back surface signal shown in FIG. 7B is due to the spatial coherence properties of the source and does not represent a weakly reflecting surface.

Figure 8:
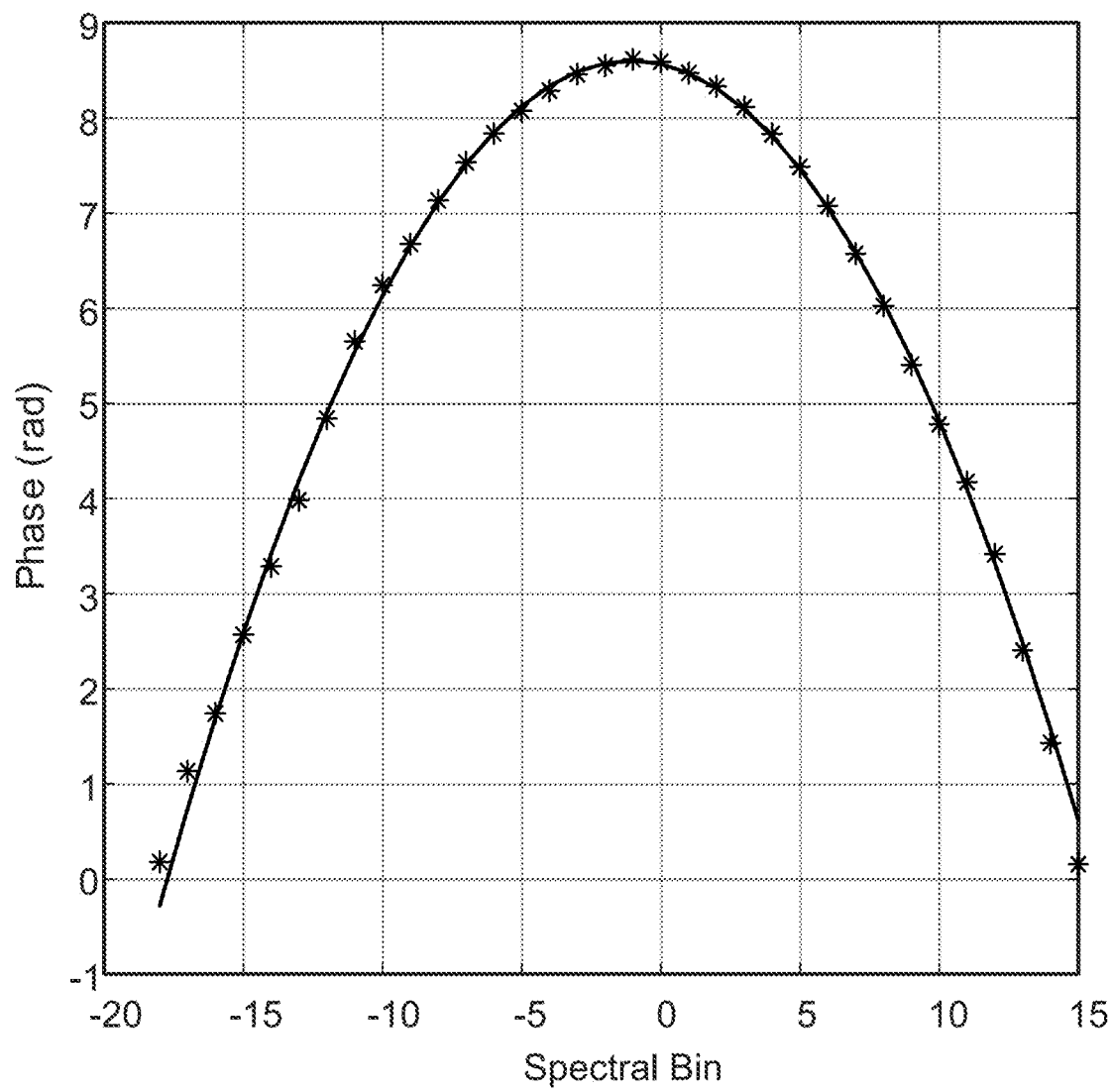
FIG. 8 is a plot showing a phase variation around the spectral peak for an interference signal.

Using the techniques disclosed herein, the signals were transformed into the frequency domain where the nonlinear part of the phase variation was identified and removed. For example, FIG. 8 is a plot showing a phase variation around the spectral peak (bin 0) for the back surface interference signal. The horizontal axis of FIG. 8 corresponds to the spectral wavenumber bin and the vertical axis corresponds to the phase in radians. As is evident from FIG. 8, the back surface interference signal exhibited a quadratic phase variation about the spectral peak. The phase variation is due to the dispersion from the intervening glass between the front and back surfaces of the glass plate. The phase variation was fit with a quadratic function 800, which was then subtracted from the frequency-domain signal.

Figure 9A:
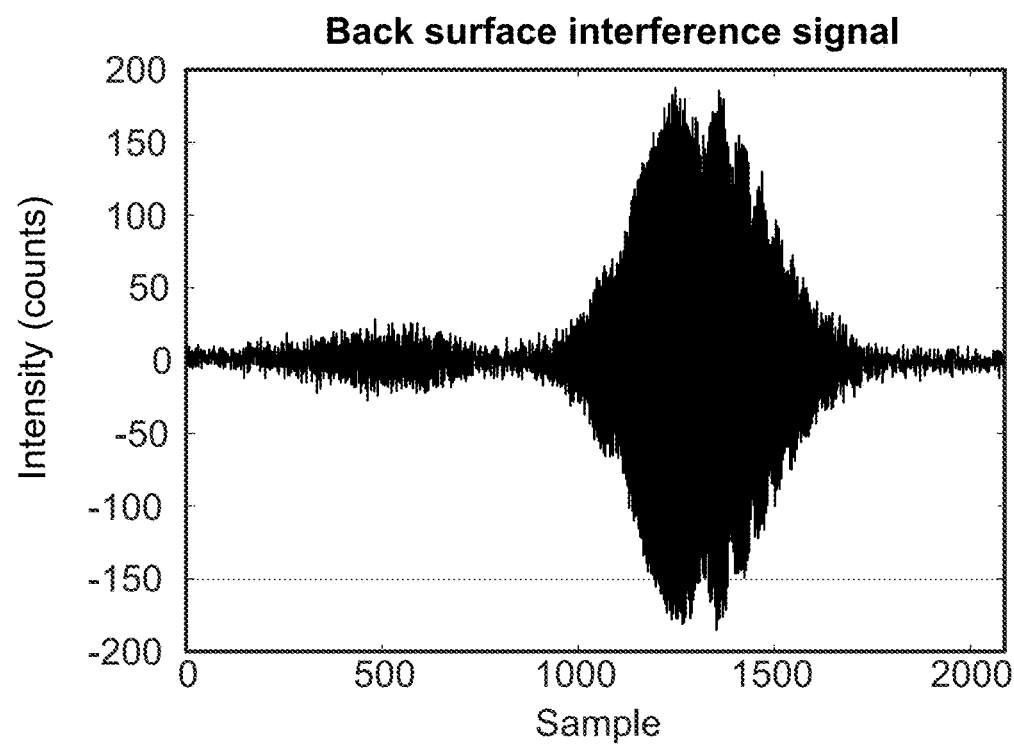
FIGS. 9A and 9B are plots showing the pixel interference signal observed from the back surface of the glass plate before and after dispersion compensation, respectively.
Figure 9B:
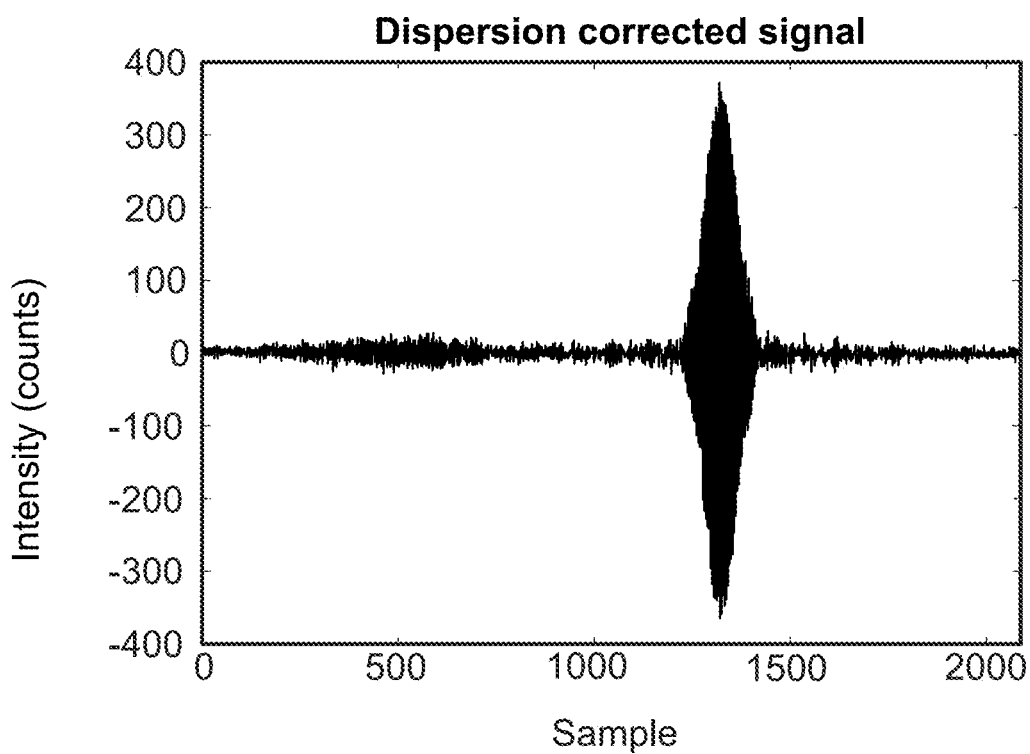

The dispersion corrected frequency-domain signal then was inverse Fourier Transformed to obtain a time-domain corrected interference signal. FIGS. 9A and 9B are plots showing the pixel interference signal observed from the back surface of the glass plate before and after dispersion compensation. As shown in FIG. 9B, the interference pattern envelope has narrowed and dispersion compensation has almost no influence on the spatial coherence peak.

As explained herein, in some cases, an initial quick scan may be performed to quickly identify interfaces within a multi-layer stack, such as locations corresponding to the positions of gaps between optical plates. An exemplary scan was performed on an optical device having a similar structure to the device 300 shown in FIG. 4. The same system as described above with respect to the experiment performed for FIGS. 7A-7B was used to obtain the quick scan data. Though device 300 shows the stack having 4 plates, the stack used in the following experiment had 6 parallel plates of glass, each of which had a thickness on the order of a few hundred microns. Adjacent plates were separated from one another by gaps of at least 10 microns. Starting from a first side of the stack (e.g., such as surface 314 of device 300), the stack was initially translated through a focal plane of the interferometer using a quick scan. In particular, the quick scan was performed at a rate of over about 140 microns/second (e.g., about 20 times as fast as a typical scan rate for a 100 Hz camera, sampling at twice the Nyquist limit for an interferometer operating with visible wavelength light) and acquired interference data over a small region of the stack to identify positions corresponding to the surfaces of the glass plates within the stack.

Figure 10:
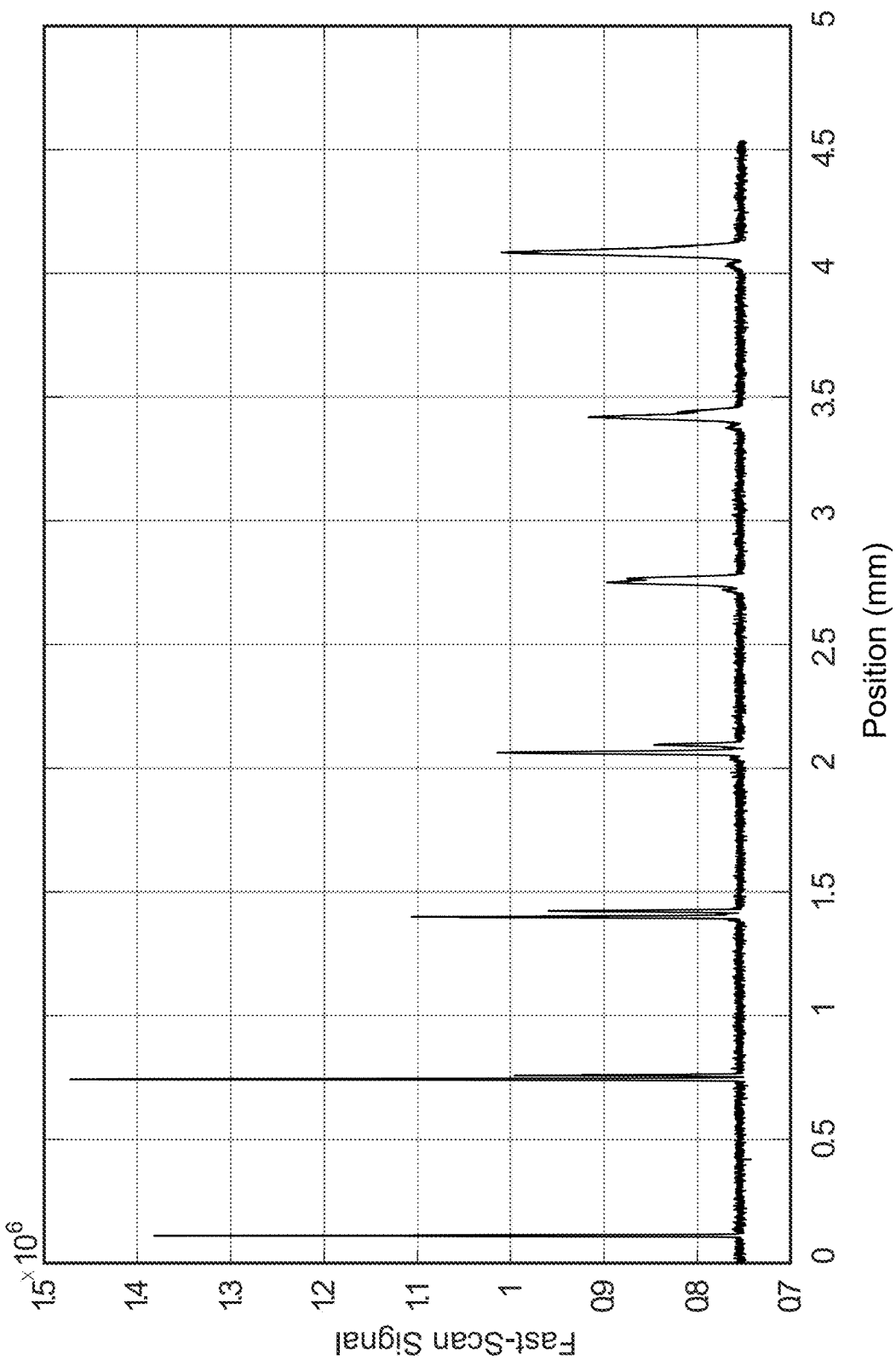
FIG. 10 is a plot that illustrates an interferometry signal obtained performing a quick scan.

FIG. 10 is a plot that illustrates the interferometry signal obtained performing the quick scan. The horizontal axis represents the scan position in millimeters and the vertical axis represents the amplitude of the interference signal. As can be seen from FIG. 10, the signal includes a first local peak amplitude at around 0.1 mm, which corresponds to the initial surface of the stack on which the measurement beam is incident (similar to surface 314 in device 300). After that first peak, the local peak amplitudes (e.g., at around 0.75 mm, around 1.4 mm, around 2.1 mm, around 2.75 mm, and around 3.4 mm) represent two closely spaced surfaces. Indeed, the signal at these locations exhibits two-closely-spaced peaks, each peak corresponding to a surface of a glass plate. As the scan progresses deeper into the part, dispersion causes the peaks to blur together (e.g., at 2.75 mm and at 3.4 mm).

After identifying the plate surfaces from the data shown in FIG. 10, the surface topography for each surface or surface pair was obtained, in turn, by repositioning the sample stage at each surface so that a short CSI scan could acquire the interference from each surface or surface pair.

Figure 11A:
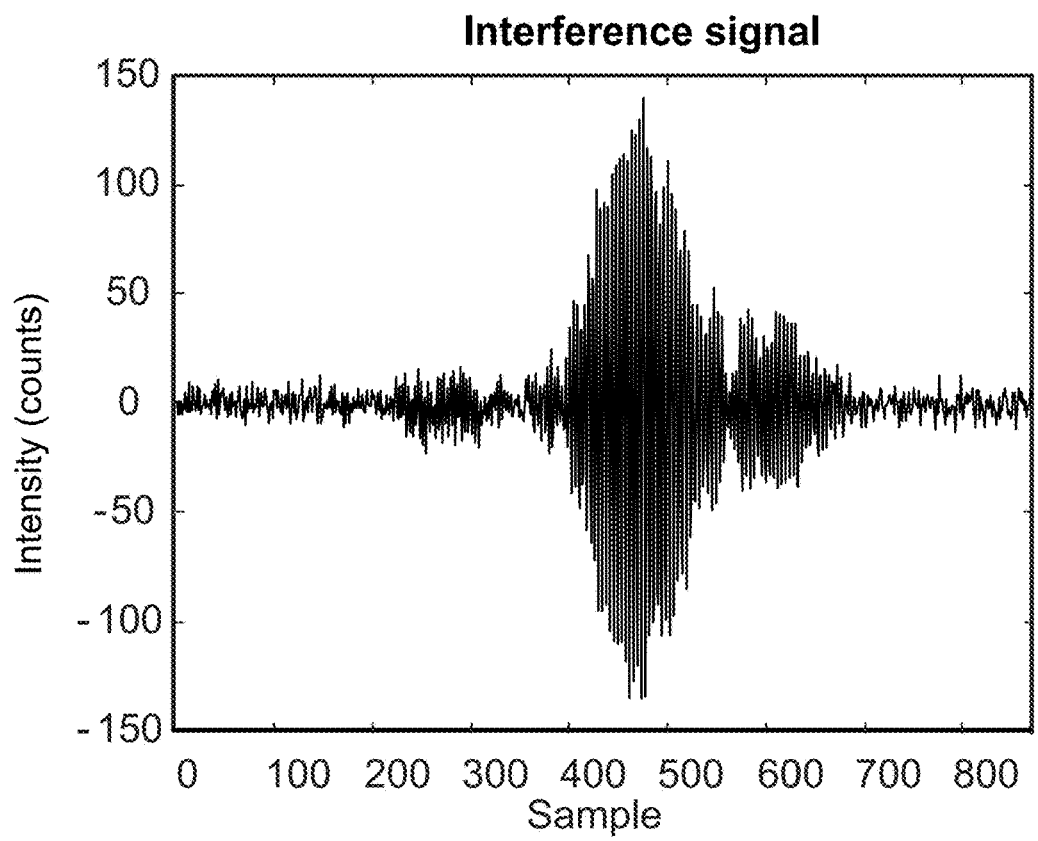
FIG. 11A is a plot that illustrates a time-domain interference signal observed by a detector in the interferometer system prior to dispersion compensation.
Figure 11B:
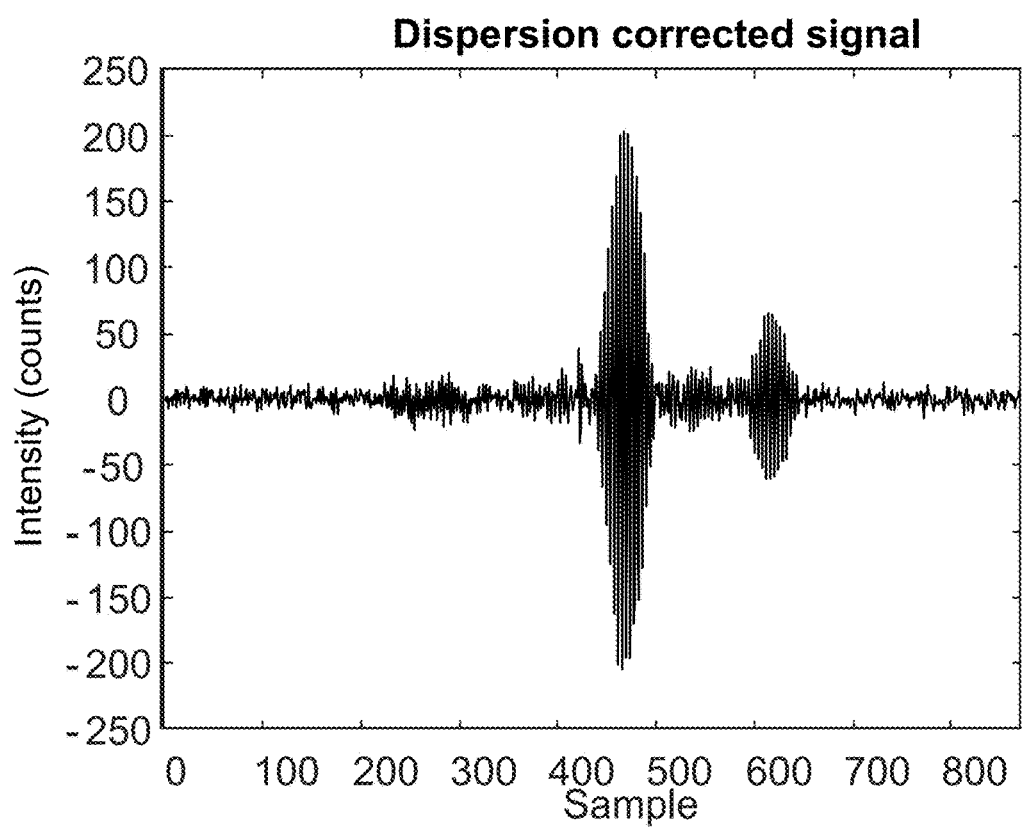
FIG. 11B is a plot that illustrates the time-domain interferometry signal of FIG. 11A after dispersion compensation has been performed.

For example, after repositioning the stage just in front of the $8^{th}$ and $9^{th}$ surfaces (corresponding to surfaces on plates 4 and 5, respectively) located at about 2.75 mm inside the stack, a 150 micron long, a 3× SubNyquist CSI scan was performed to acquire the interference from both surfaces. The mean wavelength of the system was 460 nm and the scan increment between camera frames for the 3× SubNyquist scan was 172.5 nm. FIG. 11A is a plot that shows the raw time-domain interference signal observed by one pixel of a detector in the interferometer system from the two closely spaced $8^{th}$ and $9^{th}$ surfaces before dispersion compensation. As shown in FIG. 11A, prior to dispersion compensation, the signals from each interface merge together, rendering it difficult to distinguish the interference signatures from the two surfaces. FIG. 11B is a plot that illustrates the same time-domain interferometry signal after performing dispersion compensation as disclosed herein. As shown in FIG. 11B, the peaks corresponding to the different interfaces are now readily distinguishable. From the data shown in FIG. 11B, the surface separation may be specified as about 25 microns.

Figure 12A:
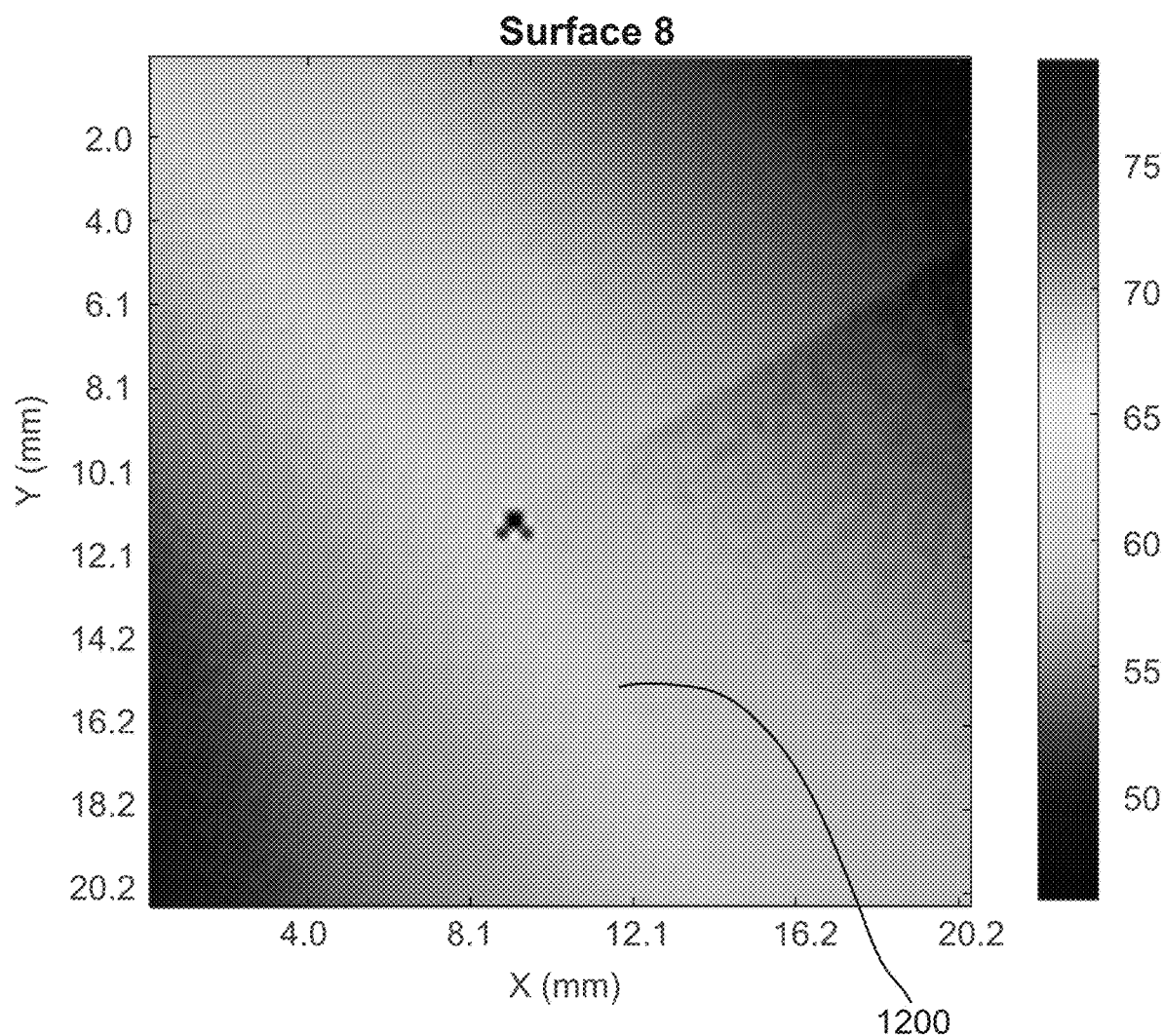
FIGS. 12A and 12B are topographical maps of a first surface and a second surface, respectively, within a stack of glass plates.
Figure 12B:
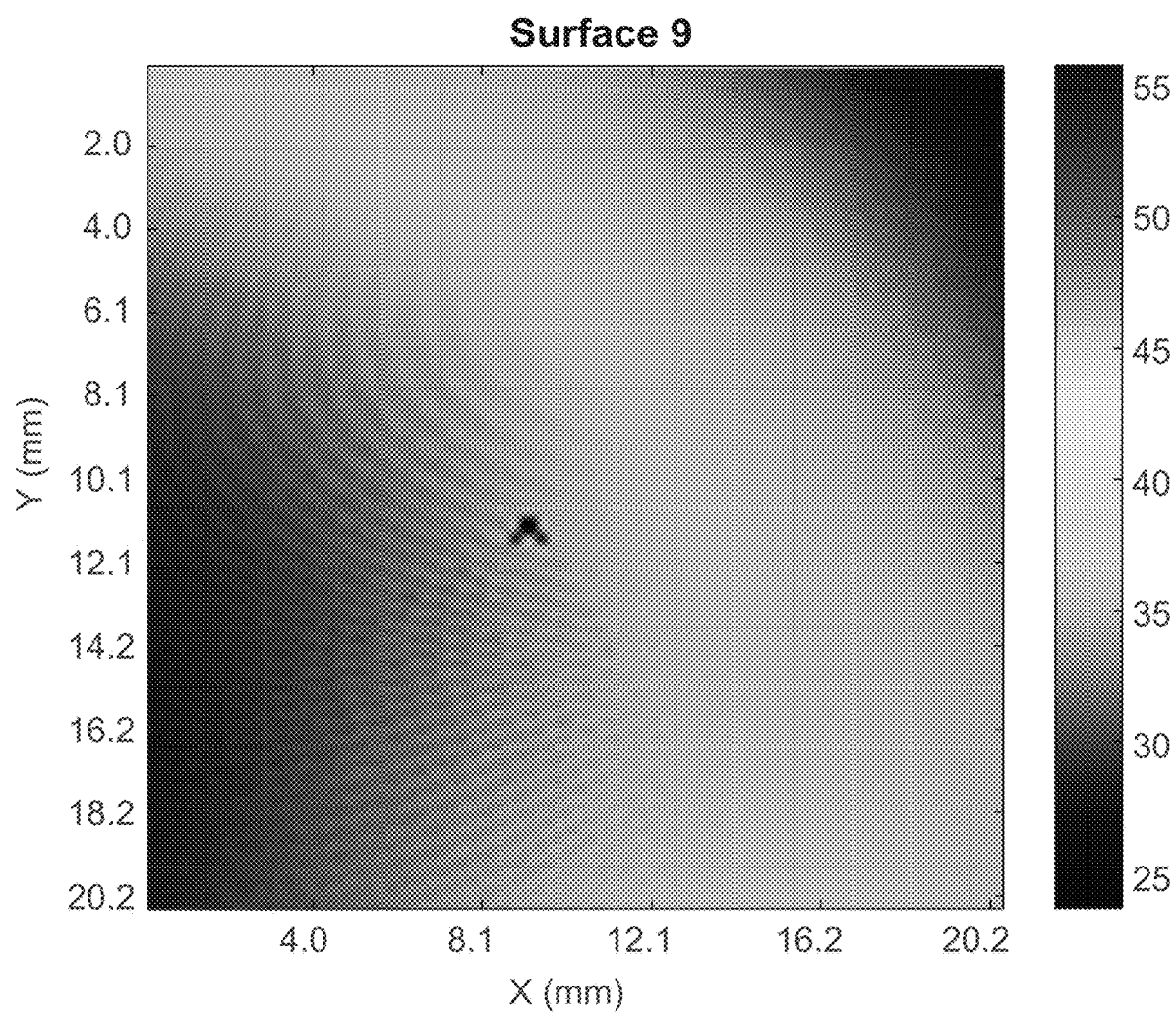
Figure 13:
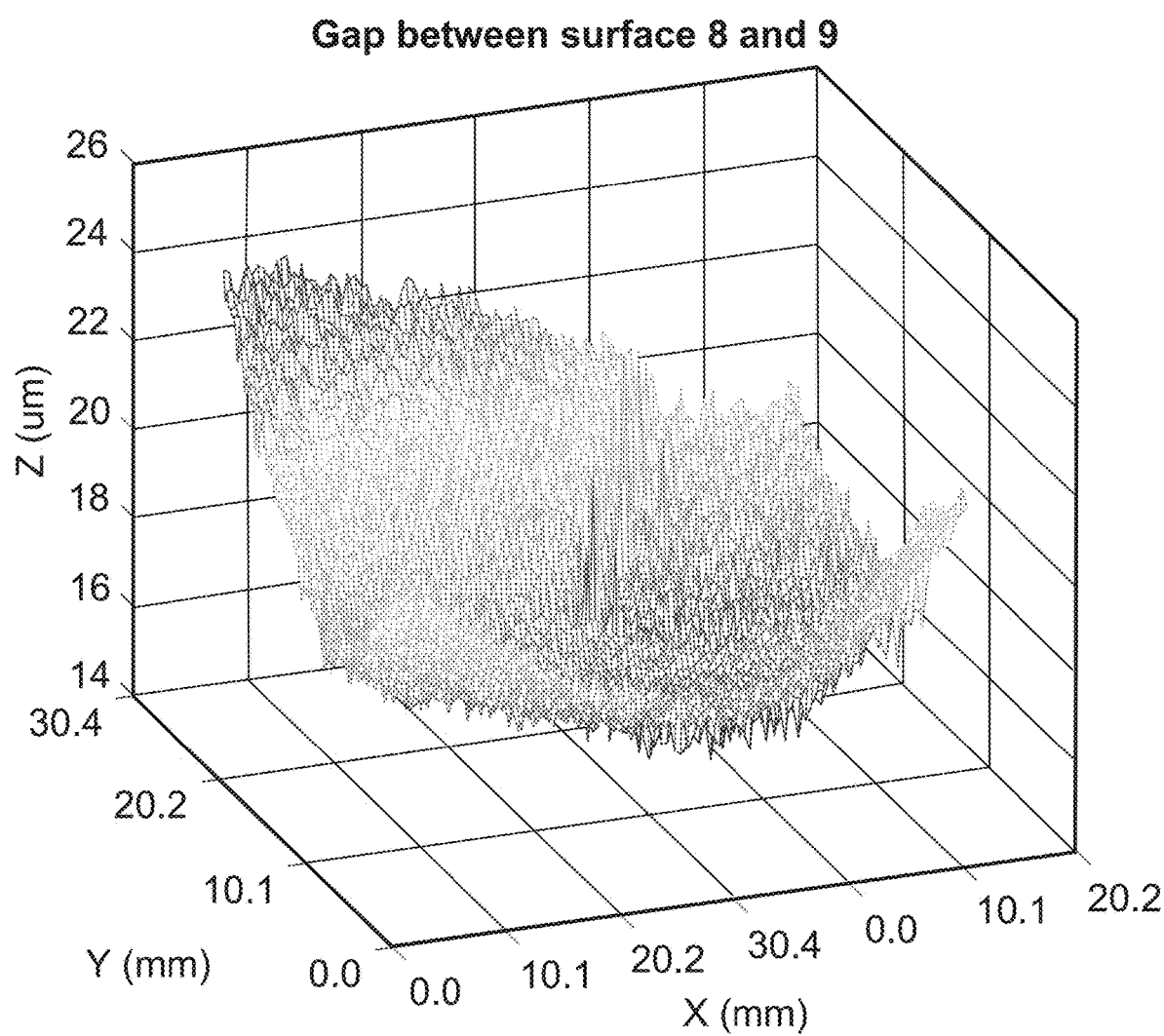
FIG. 13 is a three-dimensional map illustrating a gap thickness between the first surface and the second surface mapped in FIGS. 12A and 12B.

In some cases, the signals representing the surfaces are identified for each pixel in a field and analyzed using a CSI algorithm. For instance, for the two surfaces identified at around 2.7 mm in FIG. 10, a peak contrast algorithm was employed for each pixel in a predetermined field to produce a topographical color map for the surface. FIG. 12A is a topographical map of the first surface (surface 8 within the stack corresponding to the back surface of the $4^{th}$ glass plate) and FIG. 12B is a topographical color map of the second surface (surface 9 within the stack corresponding to the front surface of the $5^{th}$ glass plate). Surface 8 actually includes an imprinted feature which can be observed as an apparent step 1200 in FIG. 12A since the complex optical characteristics of the feature shift the contrast envelope. Since the data for those two surfaces were acquired in a single scan, their relative orientations are preserved and the gap between them can be calculated from their difference. The gap may be illustrated in a three-dimensional map, as shown in FIG. 13, where the z-axis corresponds to the gap thickness.

The other surfaces or surface pairs within the stack could also be measured as described herein until all the surfaces of metrological interest were measured. Although the scans disclosed herein were performed by illuminating the test sample from a first side, and then translating the test sample through the focal plane, in some implementations, it may be advantageous to perform a scan partially through the test sample/stack from a first side and then perform a second partial scan through the test sample/stack from a second opposite side of the test sample/stack. This can be accomplished, for example, by flipping the orientation of the test sample/stack within the sample holder after the first scan and before performing the second scan. It may be useful to perform scans in this manner when the transmissive properties of the surfaces and materials are very poor such that performing a single scan through the test sample/stack renders the signal too noisy near for interfaces near the end of the test sample/stack.

Digital Implementations

The features of the data processing described herein can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). The features can implemented in a single process or distributed among multiple processors at one or many locations. For example, the features can employ cloud technology for data transfer, storage, and/or analysis.

Scope

It must be noted that as used herein and in the appended claims, the singular forms "a", "an", and "the" include plural referents unless the context clearly dictates otherwise, e.g., when the word "single" is used.

As used herein, the terms "adapted" and "configured" mean that the element, component or other subject matter is designed and/or intended to perform a given function. Thus, the use of the terms "adapted" and "configured" should not be construed to mean that a given element, component, or other subject matter is simply "capable of" performing a given function.

As used herein, the phrases "at least one of" and "one or more of," in reference to a list of more than one entity, means any one or more of the entity in the list of entity, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made without departing from the spirit and scope of the invention. Accordingly, other implementations are within the scope of the following claims.

What is claimed is:

1. A method comprising:
    providing to an electronic processor sample interferometry data acquired for a test sample using a low coherence imaging interferometry system, wherein the test sample comprises a plurality of layers arranged in a stack;
    transforming, by the electronic processor, the sample interferometry data to a frequency domain;
    identifying a non-linear phase variation from the sample interferometry data in the frequency domain, wherein the identified non-linear phase variation is a result of dispersion introduced into a measurement beam by the test sample; and
    removing the identified non-linear phase variation from the sample interferometry data in the frequency domain thereby producing compensated interferometry data.

2. The method of claim 1, comprising:
    directing the measurement beam along a measurement beam path so as to be incident on the test sample;
    directing a reference beam along a reference beam path so as to contact a reference surface, wherein the measurement beam and the reference beam are derived from light emitted by a common source, the light comprising a plurality of wavelengths, wherein the test sample is at least partially transparent to the plurality of wavelengths;
    combining the reference beam and the measurement beam to form an output beam after the reference beam and the measurement beam contact the reference surface and the test sample, respectively;
    directing the output beam to a detector array comprising a plurality of detector elements; and
    recording, from the detector array, a plurality of interference signals, each interference signal of the plurality of interference signals corresponding to a different location on the test sample, the sample interferometry data comprising the plurality of interference signals.

3. The method of claim 2, wherein identifying the non-linear phase variation from the sample interferometry data in the frequency domain comprises
    obtaining an average phase variation of at least a subset of the plurality of interference signals in the frequency domain, and
    obtaining a function fit to the average phase variation; and
    wherein removing the identified non-linear phase variation comprises removing the function from the sample interferometry data in the frequency domain.

4. The method of claim 3, wherein the function fit to the average phase variation has a quadratic form.

5. The method of claim 3, wherein the function fit to the average phase variation has a polynomial of degree greater than two.

6. The method of claim 2, comprising:
    transforming the compensated interferometry data back to a time domain wherein the compensated interferometry data in the time domain comprises a plurality of compensated interferometry signals;
    processing, by the electronic processor, the compensated interferometry data in the time domain to determine information about the test sample.

7. The method of claim 6, wherein processing the compensated interferometry data in the time domain to determine information about the test sample comprises determining a distance between a first interface and a second interface in the test sample.

8. The method of claim 7, wherein determining the distance between the first interface and the second interface in the test sample comprises:
    identifying, for each compensated interferometry signal of the plurality of compensated interferometry signals, a first intensity peak corresponding to the first interface in the test sample and a second intensity peak corresponding to the second interface in the test sample;
    deriving, for each compensated interferometry signal of the plurality of compensated interferometry signals, a spacing between a position at which the identified first intensity peak occurs and a position at which the identified second intensity peak occurs.

9. The method of claim 8, comprising determining a level of parallelism between the first interface and the second interface based on the spacing derived for each compensated interferometry signal.

10. The method of claim 6, wherein processing the compensated interferometry data in the time domain to determine information about the test sample comprises determining a flatness of a first interface in the test sample.

11. The method of claim 6, wherein processing the compensated interferometry data in the time domain to determine information about the test sample comprises determining a thickness of a first plate in the test sample.

12. The method of claim 6, wherein processing the compensated interferometry data in the time domain to determine information about the test sample comprises determining a thickness of a thin film layer in the test sample.

13. The method of claim 6, wherein two plates within the test sample are separated by a gap, and wherein processing the compensated interferometry data in the time domain to determine information about the test sample comprises determining a thickness of the gap between the two plates.

14. The method of claim 13, further comprising generating a three-dimensional map of the gap.

15. The method of claim 13, further comprising determining an average thickness of the gap.

16. The method of claim 2, comprising:
performing an initial scan of the stack to identify information about at least one candidate interface location within the stack;
based on the information about the at least one candidate interface location within the test sample, repositioning an interferometry objective and/or the test sample so as to position a first interface of the stack adjacent to a focus plane of the measurement beam;
acquiring the sample interferometry data while translating the interferometry objective and/or the test sample such that the first interface passes through the focus plane.

17. The method of claim 16, wherein performing the initial scan comprises:
translating the interferometry objective and/or test sample relative to one another;
recording from the detector array, during the translating the interferometry objective and/or test sample relative to one another, multiple interference signals, each interference signal of the multiple interference signals corresponding to a different location on the test sample and being sampled at a sub-Nyquist frequency of an interference fringe frequency; and
determining from the multiple interference signals the at least one candidate interface location.

18. The method of claim 16, wherein performing the initial scan comprises:
positioning the test sample at a first position relative to the interferometry objective;
performing a first translation of the interferometry objective and/or the test sample relative to one another;
recording from the detector array, during the first translation, a first multiple of interference signals;
positioning the test sample at a second position relative to the interferometry objective;
performing a second translation of the interferometry objective and/or the test sample relative to one another;
recording from the detector array, during the second translation, a second multiple of interference signals; and
determining from the first multiple and the second multiple of interference signals the at least one candidate interface location.

19. The method of claim 2, wherein at least one layer in the plurality of layers arranged in the stack is a glass plate.

20. The method of claim 2, wherein the stack comprises a first plate, and a dielectric film formed on a first surface of the first plate.

21. The method of claim 2, wherein the stack comprises a first plate and a first diffraction grating formed on a first surface of the first plate.

22. The method of claim 21, wherein the first diffraction grating is an optical coupler configured to couple light into the first plate, out of the first plate, or both into and out of the first plate.

23. The method of claim 21, wherein the stack comprises a second diffraction grating on a second surface of the first plate.

24. The method of claim 23, wherein the second diffraction grating is an optical coupler configured to couple light into the first plate, out of the first plate, or both into and out of the first plate.

25. The method of claim 2, wherein the common source comprises a white light source.

26. The method of claim 2, wherein the non-linear phase variation from the sample interferometry data is identified over a range of wavenumbers observed by the low coherence imaging interferometry system.

27. A system comprising:
a low coherence light source configured to emit light over a plurality of wavelengths;
an interferometer objective configured to receive light from the light source, to direct a portion of the light as a reference beam along a reference beam path to a reference surface, to direct another portion of the light as a measurement beam along a measurement beam path to a test sample, and to combine the reference beam and the measurement beam after reflection from the reference surface and the test sample, respectively, into an output beam;
a detector array arranged to receive the output beam from the interferometer objective and to produce sample interferometry data comprising information about the test sample, the sample interferometry data comprising a plurality of interference signals, each interference signal of the plurality of interference signals corresponding to a different location on the test sample;
an electronic processor in communication with the detector array, the electronic processor being configured to transform the sample interferometry data to a frequency domain,
wherein the electronic processor is further configured to identify a non-linear phase variation from the sample interferometry data in the frequency domain, the non-linear phase variation being a result of dispersion introduced into the measurement beam by the test sample, and to remove the identified non-linear phase variation from the sample interferometry data to produce compensated interferometry data.

28. The system of claim 27, wherein the electronic processor is further configured to
obtain an average phase variation of at least a subset of the plurality of interference signals in the frequency domain; and
apply a fit to the average phase variation.

29. The system of claim 28, wherein the fit to the average phase variation has a quadratic form.

30. The system of claim 28, wherein the fit to the average phase variation is a polynomial of degree greater than two.

31. The system of claim 27, wherein the electronic processor is further configured to:

transform the compensated interferometry data back to a time domain wherein the compensated interferometry data in the time domain comprises a plurality of compensated interferometry signals;

process the compensated interferometry data in the time domain to determine information about the test sample.

32. The system of claim 31, wherein the information about the test sample comprises a distance between a first interface and a second interface in the test sample.

33. The system of claim 32, wherein processing the compensated interferometry data in the time domain, by the electronic processor, to determine the distance between the first interface and the second interface in the test sample comprises:

identifying, for each compensated interferometry signal of the plurality of compensated interferometry signals, a first intensity peak corresponding to the first interface in the test sample and a second intensity peak corresponding to the second interface in the test sample; and deriving, for each compensated interferometry signal of the plurality of compensated interferometry signals, a spacing between a position at which the identified first intensity peak occurs and a position at which the identified second intensity peak occurs.

34. The system of claim 31, wherein the information about the test sample comprises a flatness of a first interface in the test sample.

35. The system of claim 31, wherein the information about the test sample comprises a thickness of a first plate in the test sample.

36. The system of claim 31, wherein two plates within the test sample are separated by a gap, and wherein the information about the test sample comprises a thickness of the gap between the two plates.

37. The system of claim 31, wherein the information about the test sample comprises a thickness of a thin film layer in the test sample.

38. The system of claim 27, wherein the interferometer objective comprises a Michelson interferometer objective.

39. The system of claim 27, wherein the interferometer objective comprises a Mirau interferometer objective, a Linnik interferometer objective, or a wide field objective.

40. The system of claim 27, wherein the low coherence light source comprises a white light source.

* * * * *